(12) United States Patent
Proulx et al.

(10) Patent No.: US 11,194,506 B1
(45) Date of Patent: Dec. 7, 2021

(54) EFFICIENCY SETS FOR DETERMINATION OF UNIQUE DATA

(71) Applicant: NetApp, Inc., Sunnyvale, CA (US)

(72) Inventors: Alyssa Proulx, Longmont, CO (US); Mark David Olson, Longmont, CO (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 16/940,461

(22) Filed: Jul. 28, 2020

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 10,229,048 B2 * | 3/2019 | Battaje | G06F 12/1009 |
| 10,635,690 B1 * | 4/2020 | Blackwell, Jr. | G06F 16/27 |
| 2013/0110766 A1 * | 5/2013 | Promhouse | G06F 16/2365 707/607 |

* cited by examiner

*Primary Examiner* — Brian R Peugh
(74) *Attorney, Agent, or Firm* — Haynes and Boone, LLP

(57) ABSTRACT

A system, method, and machine-readable storage medium for determining an amount of unique data in a distributed storage system are provided. In some embodiments, a combined efficiency set for a first data set stored in the distributed storage system, such as at a volume, may be generated. The first data set may include a first subset of data and a second subset of data in the distributed storage system. Additionally, a set of efficiency sets for the first subset of data may be generated. A set difference based on the combined efficiency set and the set of efficiency sets may be computed. An amount of memory used for storing unique data of the second subset of data may be estimated based on the set difference. The unique data may be present in the second subset of data but absent from the first subset of data.

20 Claims, 14 Drawing Sheets

EFFICIENCY SETS FOR DETERMINATION OF UNIQUE DATA

TECHNICAL FIELD

The present description relates to data storage systems, and more specifically, to a system, method, and machine-readable storage medium for improving system operation by improving memory usage information in a distributed storage system for improved user experience.

BACKGROUND

A plurality of storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume. For example, the metadata may describe, e.g., identify, storage locations on the devices for the data. The data of each volume may be divided into data blocks. The data blocks may be distributed in a content driven manner throughout the nodes of the cluster.

A client may write data to, read data from, and/or delete data stored in the distributed storage system. Data may be deleted from the system when a client address at which the data is stored is overwritten with other data or when a client address becomes invalid (e.g., a file or object is deleted). There is not a one-to-one mapping, however, between the client addresses and stored data blocks because multiple client addresses may have the same data block referenced by the same block identifier. For example, a data block should not be deleted if it is being referenced by another client address.

BRIEF DESCRIPTION OF THE DRAWINGS

The present disclosure is best understood from the following detailed description when read with the accompanying figures.

DETAILED DESCRIPTION

Figure 1:
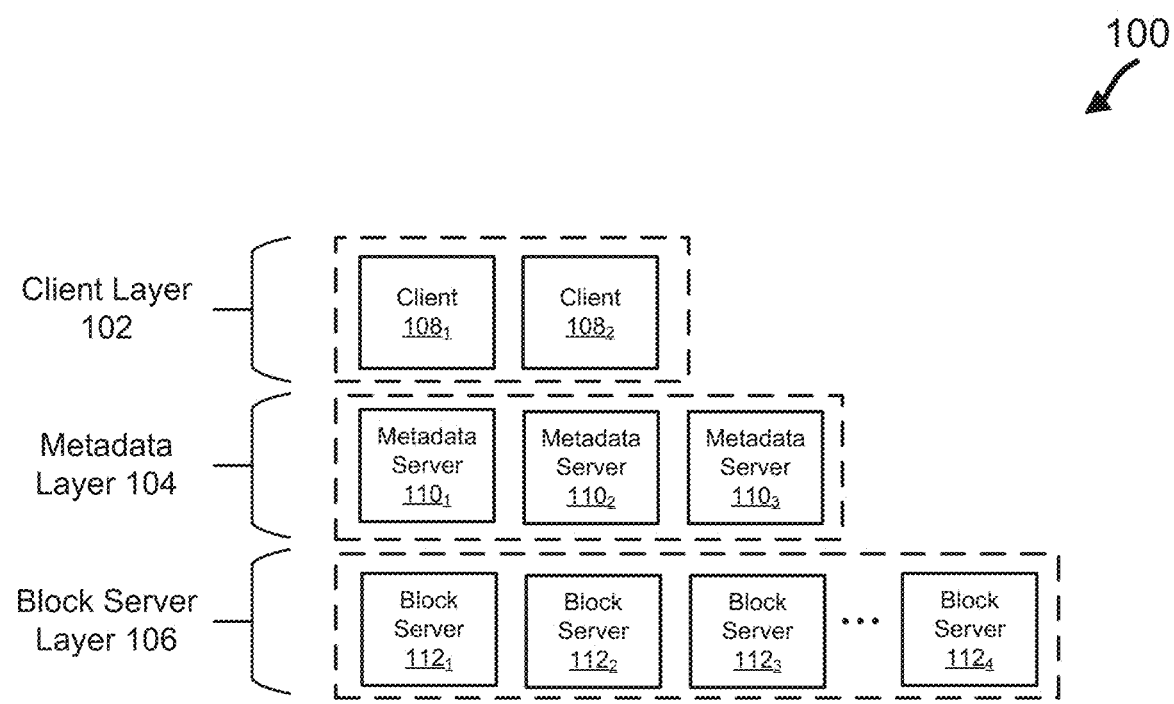
FIG. 1 illustrates a system for a distributed data storage system according to one or more aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments, unless noted otherwise. Finally, in view of this disclosure, particular features described in relation to one aspect or embodiment may be applied to other disclosed aspects or embodiments of the disclosure, even though not specifically shown in the drawings or described in the text.

A distributed storage system may include one or more storage nodes, and each storage node may include one or more slice services. In the present disclosure, "slice service" may be used interchangeably with "metadata service". A slice service may refer to metadata for a volume of data and/or references to data blocks that compose the volume. Each slice service may include one or more volumes, and a client may store data to multiple volumes, retrieve data from multiple volumes, and/or modify data stored on multiple volumes. A client may write data to, read data from, and/or delete data stored in the distributed storage system. The client may desire to know how much memory would be reclaimed or recovered by deleting a data object from the distributed storage system. A data object may refer to a data set stored at one or more volumes. The data object may be, for example, a set of one or more snapshots, the data stored at one or more volumes, etc.

It may be difficult to determine the amount of memory that would be recovered from deletion of a data object because multiple client addresses may reference a data block in block storage. For example, if the client were to remove a snapshot that references a data block from the distributed storage system, the data block may still need to remain in the system because the data block is referenced by another client address. It may be desirable to determine data blocks that are unique to a first data object (e.g., snapshot) such that the unique data blocks are referenced by the first data object and no other data objects. Accordingly, if the client were to request that the first data object be deleted, the unique data blocks would be removed from the distributed storage system and accordingly an amount of memory used for storing the unique data blocks may be reclaimed or recovered. For example, if the client is charged a fee for storing data in the distributed storage system, the client may be interested in having a true understanding of how much memory storage would be recovered based on the delete operation. The recovery of an amount of memory used for storing unique data storage may refer to how much memory space is freed up based on a delete operation.

The present disclosure provides a content manager that determines an amount of memory used for storing unique data of a data object and the amount of memory that would be recovered based on deletion of the data object. It may be time consuming, however, to determine how much actual space is recovered when deleting a first data object, where the first data object has some data blocks referenced by other client addresses for other data objects that are not actually deleted with the deletion of the data object.

In some aspects, the content manager may estimate the amount of memory that is freed up based on a delete option by using efficiency sets. For example, one or more servers of a volume may be configured to generate sets of block identifiers that correspond to the data blocks of the volume (also referred to herein as "efficiency sets"). These efficiency sets can be used to decrease computation time of various operations, such as estimating the uniqueness of a data set (e.g., volume of data, a set of one or more snapshots stored at a volume). The content manager may generate an efficiency set at, for example, the snapshot level or volume level. For example, the content manager may generate an efficiency set for a universal data set including a first data set and a second data set. If the client desires to know an estimated amount of memory used for storing unique data that would be recovered based on deleting the second data set, the content manager may generate an efficiency set for the first data set and determine a set difference based on subtracting the efficiency set for the first data set from the efficiency set for the universal data set. The content manager may determine, based on the set difference, an estimated amount of memory used for storing the unique data of the second subset of data, where the unique data is referenced by the second subset of data but not referenced by the first subset of data. Efficiency sets are explained in greater detail below.

Aspects of the present disclosure can provide several benefits. For example, aspects may provide for reducing the time consumed for estimating an amount of memory used for storing unique data of the second data set, as discussed above. Aspects may also provide the user with storage space information regarding the recovery of memory, allowing for a better user experience.

FIG. 1 illustrates a system 100 for a distributed data storage system according to one or more aspects of the present disclosure. The system 100 includes a client layer 102, a metadata layer 104, and a block server layer 106. The client layer 102 includes clients $108_1$ and $108_2$ in the illustrated example. The metadata layer 104 includes metadata servers $110_1$, $110_2$, and $110_3$ in the illustrated example. The block server layer 106 includes block servers $112_1$, $112_2$, $112_3$, and $112_4$ in the illustrated example. Although the client layer 102 is shown as including two clients 108, the metadata layer 104 is shown as including three metadata servers 110, and the block server layer 106 is shown as including four block servers 112, these examples are not intended to be limiting and in other examples, the client layer 102, the metadata layer 104, and the block server layer 106 may include any number (one or more) of clients 108, metadata servers 110, and block servers 112, respectively.

Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. When operating across multiple machines, the machines may communicate using a network interface, such as a local area network (LAN) or a wide area network (WAN). In some embodiments, one or more metadata servers 110 may be combined with one or more block servers 112 in a single machine. Entities in the system 100 may be virtualized entities. For example, multiple virtual block servers 112 may be included on a machine. Entities may also be included in a cluster, where computing resources of the cluster are virtualized such that the computing resources appear as a single entity.

The clients 108 include client processes that may exist on one or more physical machines. When the term "client 108" is used in the present disclosure, the action being performed may be performed by a client process. A client process may be responsible for storing, retrieving, and/or deleting data in the system 100. A client process may address pieces of data depending on the nature of the storage system and the format of the data stored. For example, the client process may reference data using a client address, which may take different forms. For example, in a storage system that uses file storage, the client 108 may reference a particular volume or partition, and a file name. For object storage, the client address may be a unique object name. For block storage, the client address may be a volume or partition, and a block address. The clients 108 may communicate with the metadata layer 104 using different protocols, such as small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol.

The block servers 112 store data for clients 108. In some embodiments, data may be broken up into one or more storage units. A storage unit may also be referred to as a data block. Data may be segmented into data blocks. A block is the raw data for a volume and may be the smallest addressable unit of data. Data blocks may be of a fixed size, may be initially a fixed size but compressed, or may be of a variable size. Data blocks may also be segmented based on the contextual content of the block. For example, data of a particular type may have a larger data block size compared to other types of data. Maintaining segmentation of the blocks on a write (and corresponding re-assembly on a read) may occur in the client layer 102 and/or the metadata layer 104. Also, compression may occur in the client layer 102, the metadata layer 104, and/or the block server layer 106.

In some examples, data may be stored in a volume that is referenced by the client 108. A volume may be made up of one or more volume slices. The data associated with the volume includes a list of volume slices for that volume. A volume slice is a list of blocks for a portion of a volume.

The block servers 112 may store data on a storage medium. The storage medium may include different medium formats. For example, electromechanical disk storage or a solid state storage drive may be used. Electromechanical disk storage may include spinning disks that use movable read/write heads to read/write to/from different locations of the spinning disks. Inserting the read/write head at various random locations results in slower data access than if data is read from a sequential location. A solid state storage drive uses a solid state memory to store persistent data. Solid state drives may use microchips that store data in non-volatile memory chips and may contain no moving parts. Solid state drives may also perform random access and parallel reads/writes efficiently.

Data from the clients may be stored non-sequentially. In various implementations, non-sequentially storing data in storage is based upon breaking data up into one more data blocks. In addition to storing data non-sequentially, data blocks can be stored to achieve substantially even distribution across the storage system. In various examples, even distribution can be based upon a unique block identifier. For example, the data blocks may be stored in the block server layer 106 based on unique block identifiers. A block identifier may also be referred to as a content identifier and may be used interchangeably in the present disclosure.

A block identifier can be an identifier that is determined based on the content of the data block, such as by a hash of the content (e.g., a cryptographic hash function (e.g., Skein algorithm) that generates a hash value identified herein as the "block identifier"). The block identifier is unique to that block of data. For example, blocks with the same content have the same block identifier but blocks with different content have different block identifiers. The values of possible unique identifiers can have a uniform distribution. The block servers 112 maintain a mapping between a block identifier and the location of the data block in a storage medium of block server 112. Data blocks with the same block identifiers are not stored multiple times on a block server 112 when received in multiple client write requests.

A bin may be derived from the block ID for storage of a corresponding data block by extracting a predefined number of bits from the block identifiers introduced in the present disclosure. In some embodiments, the bin may be divided into buckets or "sublists" by extending the predefined number of bits extracted from the block identifier. A bin identifier may be used to identify a bin within the system. The bin identifier may also be used to identify a particular block service (e.g., block service 309$_1$-209$_n$ in the example of FIG. 3) and associated storage devices (e.g., SSDs). A sublist identifier may identify a sublist with the bin, which may be used to facilitate network transfer (or syncing) of data among block services in the event of a failure or crash of a storage node. Accordingly, a client can access data using a client address, which is eventually translated into the corresponding unique identifiers that reference the client's data at the storage node. Bin assignments may be stored in a distributed key-value store across a cluster (e.g., a cluster 302 in FIG. 3) (e.g., in a so-called "zookeeper" database as just one example). Accordingly, storing data blocks based upon the unique identifier, or a portion of the unique identifier, results in the data being stored substantially evenly across storage devices in the cluster. Because client data, e.g., a volume associated with the client, is spread evenly across all of the storage devices in the cluster, every storage device in the cluster may be involved in the read and write paths of each volume. This configuration may balance the data and load across all of the storage devices. Such an arrangement may remove hot spots within the cluster, which can occur when the client's data is stored sequentially on any volume.

In addition, having data spread evenly across storage devices in the cluster allows a consistent total aggregate performance of a cluster to be defined and achieved. This aggregation can be achieved, since data for each client is spread evenly through the storage devices. Accordingly, a client's I/O will involve all the storage devices in the cluster. Because clients have their data spread substantially evenly through all the storage devices in the storage system, a performance of the system can be described in aggregate as a single number, e.g., the sum of performance of all the storage devices in the storage system.

Furthermore, data may be deduplicated in a cluster based on the block identifiers. For example, if clients 108$_1$ and 108$_2$ each store the same data, the stored data can have the same block identifier (as the block identifier is based on the content of the data block). As a result, that particular data block need only be stored once in a cluster of storage, as opposed to storing the data block separately for both the client 108$_1$ and the client 108$_2$. Accordingly, the amount of storage in use can be reduced by storing only unique data blocks. One effect of dedupability of data is that the unique storage space used by a volume compared to other volumes in a cluster cannot be determined from the size of the logical volume (e.g., as tracked by the metadata layer 104). This is because a volume may share at least some of its data with another volume in the cluster, such that when the volume is deleted the shared data portion will still remain in the cluster, and available to the other volume. For example, if a data block is shared between two data objects (e.g., between two snapshots or between a snapshot and an active data set), the data block is stored once and referenced by each of the two data objects.

The present disclosure provides techniques for determining an estimated amount of memory used for storing unique data blocks. For example, the content manager may estimate the amount of memory that is freed up based on a delete option by using efficiency sets. The content manager may generate an efficiency set for a universal data set including a first data set and a second data set. If the client desires to know an estimated amount of memory used for storing unique data that would be recovered based on deleting the second data set, the content manager may generate an efficiency set for the first data set and determine a set difference based on subtracting the efficiency set for the first data set from the efficiency set for the universal data set. The content manager may determine, based on the set difference, an estimated amount of memory used for storing the unique data of the second subset of data, where the unique data is referenced by the second subset of data but not referenced by the first subset of data.

The metadata layer 104 may store metadata that maps between the client layer 102 and the block server layer 106. For example, metadata servers 110 may map between the client addressing used by the clients 108 (e.g., file names, object names, block numbers, etc.) and block layer addressing (e.g., block identifiers) used in the block server layer 106. The clients 108 may perform access based on client addresses, and block servers 112 may store data based on unique block identifiers for the data.

Figure 2:
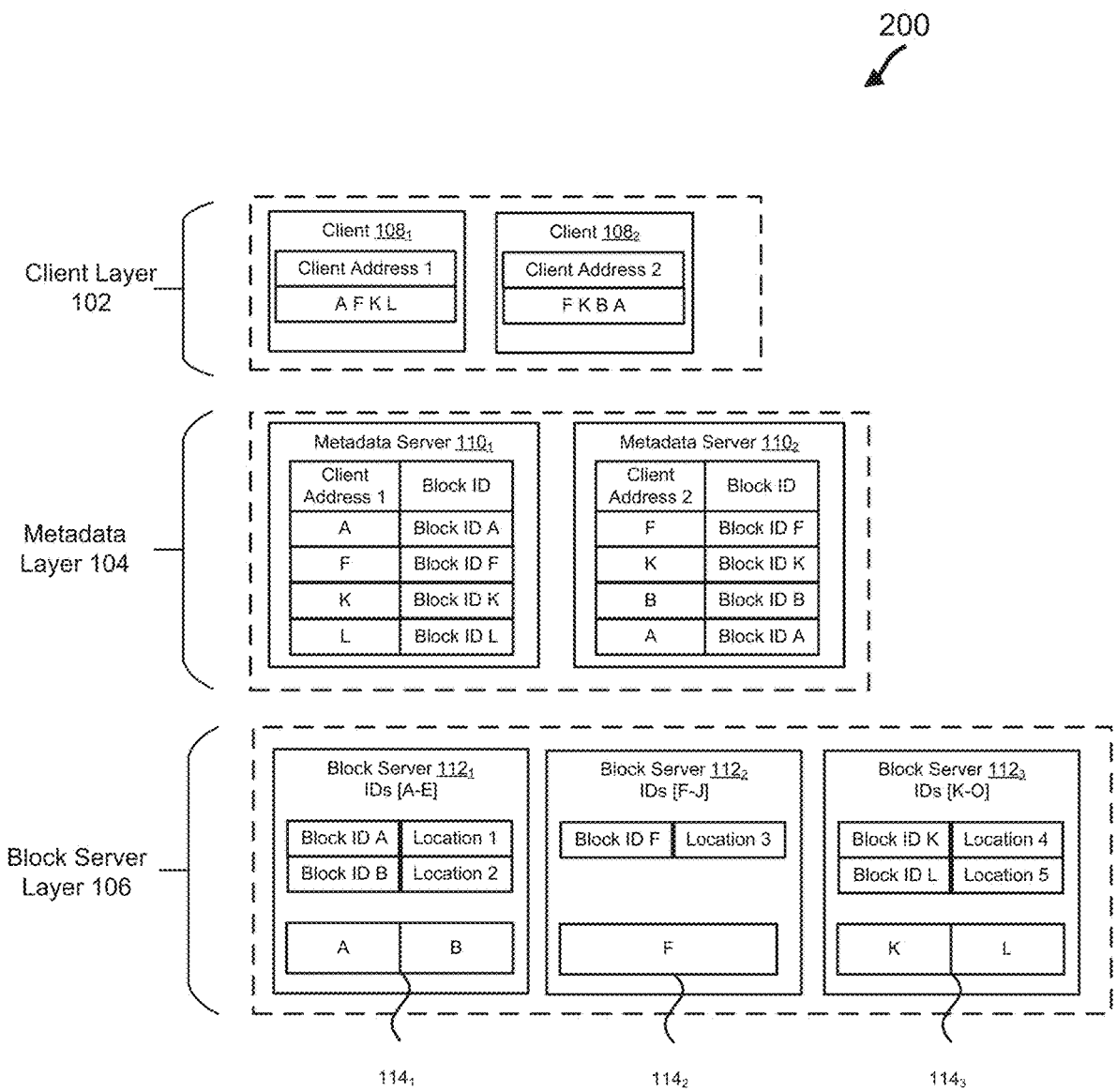
FIG. 2 illustrates a more detailed example of data storage in the system according to one or more aspects of the present disclosure.

FIG. 2 illustrates a more detailed example 200 of data storage in the system 100 according to one or more aspects of the present disclosure. A client 108$_1$ and a client 108$_2$ may wish to read data from and/or write data to the distributed data storage system. For example, client 108$_1$ may wish to write data to a volume at a client address 1. The client address 1 may include a target name of the volume and a list of block numbers (e.g., logical block addresses, "LBAs"). The data that client 108$_1$ wishes to write may include data blocks A, F, K, and L (e.g., the content to be written).

The client 108$_2$ may wish to write data at a client address 2. For example, client address 2 may reference a different volume than client address 1 and a different list of block numbers. Other formats of client addressing may also be used. For discussion purposes, the client address 1 and client address 2 may be used to reference the respective data blocks and block numbers (e.g., LBAs). The data that client $108_2$ wishes to write may include data blocks F, K, B, and A. Accordingly, data blocks A, F, and K are duplicates between the data that the client $108_1$ and the client $108_2$ respectively wish to write.

The metadata layer 104 may include the metadata server $110_1$ and the metadata server $110_2$. Different metadata servers may be associated with different client addresses. For example, different metadata servers 110 may manage different volumes of data. In this example, metadata server $110_1$ is designated as handling client address 1, and metadata server $110_2$ is designated as handling client address 2.

For each client address, a list of block numbers may be stored. The block numbers may represent data blocks associated with the client address. For example, for client address 1, the block identifiers (also referred to as "block IDs" herein for the example given in FIG. 2) of data blocks A, F, K, and L are stored and associated with client address 1. Each block identifier is associated with a block of data (e.g., block ID A is associated with the data block A, block ID B is associated with the data block B, etc.). Similarly, in metadata server $110_2$, the client address 2 is associated with block IDs of data blocks F, K, B, and A (e.g., block ID F for data block F, etc.).

The block server layer 106 includes block servers $112_1$, $112_2$, and $112_3$. In an example, the block servers 112 are assigned to different ranges of block identifiers. For example, block server $112_1$ may be assigned to store data for block identifiers A-E, block server $112_2$ may be assigned to store data for block identifiers F-J, and block server $112_3$ may be assigned to store data for block identifiers K-O. In this example, data for a client address may not be stored in sequential locations on a storage medium in a single block server 112. Rather, the data may be stored based on the block identifier determined from the content of the data.

Following the example in FIG. 2, the block server $112_1$ stores data for block identifier A and block identifier B. Thus, in the example of FIG. 2 the block server $112_1$ stores data blocks A and B, based on the corresponding block identifiers A and B. Additionally, the block server $112_1$ may maintain a mapping between the block identifier A and the location on the storage medium where the data associated with block identifier A is stored. For example, block identifier A may be mapped to a location 1 where data for block identifier A (e.g., data block A) is stored on block server $112_1$, and block identifier B may be mapped to a location 2 where data for block identifier B (e.g., data block B) is stored on block server $112_1$. Additionally, block server $112_2$ stores data for block identifier F in location 2 on block server $112_2$, and block server $112_3$ stores data for block identifiers K and L in locations 4 and 5, respectively, in block server $112_3$.

In some examples, the data blocks for a client address are not stored in sequential locations on a storage medium 114. For example, for client address 1, data block A may be stored on block server $112_1$ in storage medium $114_1$, data block F is stored on block server $112_2$ in storage medium $114_2$, and data blocks K and L are stored on block server $112_3$ in storage medium $114_3$. In some examples, the storage medium 114 in a block server 112 may be a solid state device, such as non-volatile memory (e.g., flash memory). The solid state device may be electrically programmed and erased. The data blocks may be stored on the solid state device and persist when block server 112 is powered off. Solid state devices allow random access to data in an efficient manner and include no physical moving parts. For example, the random access is more efficient using solid state devices than if a spinning disk is used. Thus, data stored in data blocks for a client address in a non-contiguous address space and even different block servers 112 may still be accessed efficiently. In some examples, the storage medium 114 may include multiple solid state drives (e.g., flash memory drives). Each drive may store data (e.g., data blocks) for a portion of the range of block identifiers. Although a solid state device is described, it will be understood that spinning disks may also be used with particular embodiments.

As noted above, the unique data stored in a volume compared to other volumes in a cluster cannot be determined from the size of the volume. To calculate the precise amount of memory used for storing unique data in a volume of a cluster may involve determining, for each block identifier of the volume, if the block identifier is used in any other volume in the cluster. Given the number and size of block identifiers, the time and memory required to calculate this number is not feasible. As described in greater detail below, efficiency sets can be used to estimate the amount of memory used for storing unique data of a first data set stored at one or more volumes compared with second data sets stored at one or more volumes. One use of efficiency sets is to calculate an estimate of an amount of memory used for storing unique data that would be freed up if the first data set were removed from the cluster. Accordingly, use of efficiency sets may assist in calculating an estimate of how much space is occupied by unique data that, when deleted, frees up the corresponding physical space if removed. Other applications of efficiency sets are described below.

One or more servers of a volume (e.g., servers of metadata layer 104, block server layer 106, etc.) can be configured to generate sets of block identifiers that correspond to the data blocks of the volume. These efficiency sets can be used to decrease computation time of various operations, such as estimating the uniqueness of a data set (e.g., volume of data, a set of one or more snapshots stored at a volume) or determining on what cluster to import a new volume of data. Each block identifier for a block of volume data can be obtained, masked (e.g., via a bitwise OR operation, a bitwise AND operation, changing a bit to become a "0" or "1", or otherwise), and compared to a masked comparison block identifier to form an efficiency set for a volume, as will be described further below. A mask may also be referred to as a bitmask. In an example, one or more bits of a block identifier are masked to a binary "0". In another example, one or more bits of a block identifier are masked to a binary "1". In another example, whether one or more particular bits are masked to be "0" or "1" is random and independent of a mask applied to other bits. For example, a random seed may be used to generate a random number on which an entire bitmask or comparison block identifier is based, or it may be used to randomly determine whether a particular bit is masked to become a "0" or "1". Each of the masked block identifiers may be compared to the masked comparison block identifier. If a masked block identifier matches the masked comparison block identifier, then the unmasked block identifier corresponding to the masked block identifier is determined to be part of the applicable efficiency set. An unmasked block identifier corresponds to a masked block identifier if a result of applying the mask to the unmasked block identifier yields the masked block identifier as the result.

In an example, an amount of bits to be masked in order to generate an efficiency set is increased iteratively until a desired memory storage requirement and/or computation requirement is met. For example, the size of a bitmask (i.e., the number of bits being masked or the order of the bitmask)

may be increased until a resulting efficiency set only consumes a certain amount of memory space or computational resources to further process. Thus, each volume can have a corresponding efficiency set based on its block identifiers and an applied mask. Additionally or alternatively, efficiency sets can be generated from block identifiers corresponding to data sets stored one or more volumes, multiple volumes of a cluster of data, and/or the block identifiers of an entire cluster, etc. By creating and maintaining such efficiency sets, multiple data sets, volumes (or clusters) of data, etc., may be quickly compared to estimate amounts of unique data. The present disclosure provides techniques for using efficiency sets to estimate an amount of memory used for storing unique data that would be freed up or recovered if a data set stored at one or more volumes were removed from the distributed storage system. The estimated amount of memory may be less than the amount of memory used for storing the data set if the data set references data blocks that are referenced by other data objects.

Figure 3:
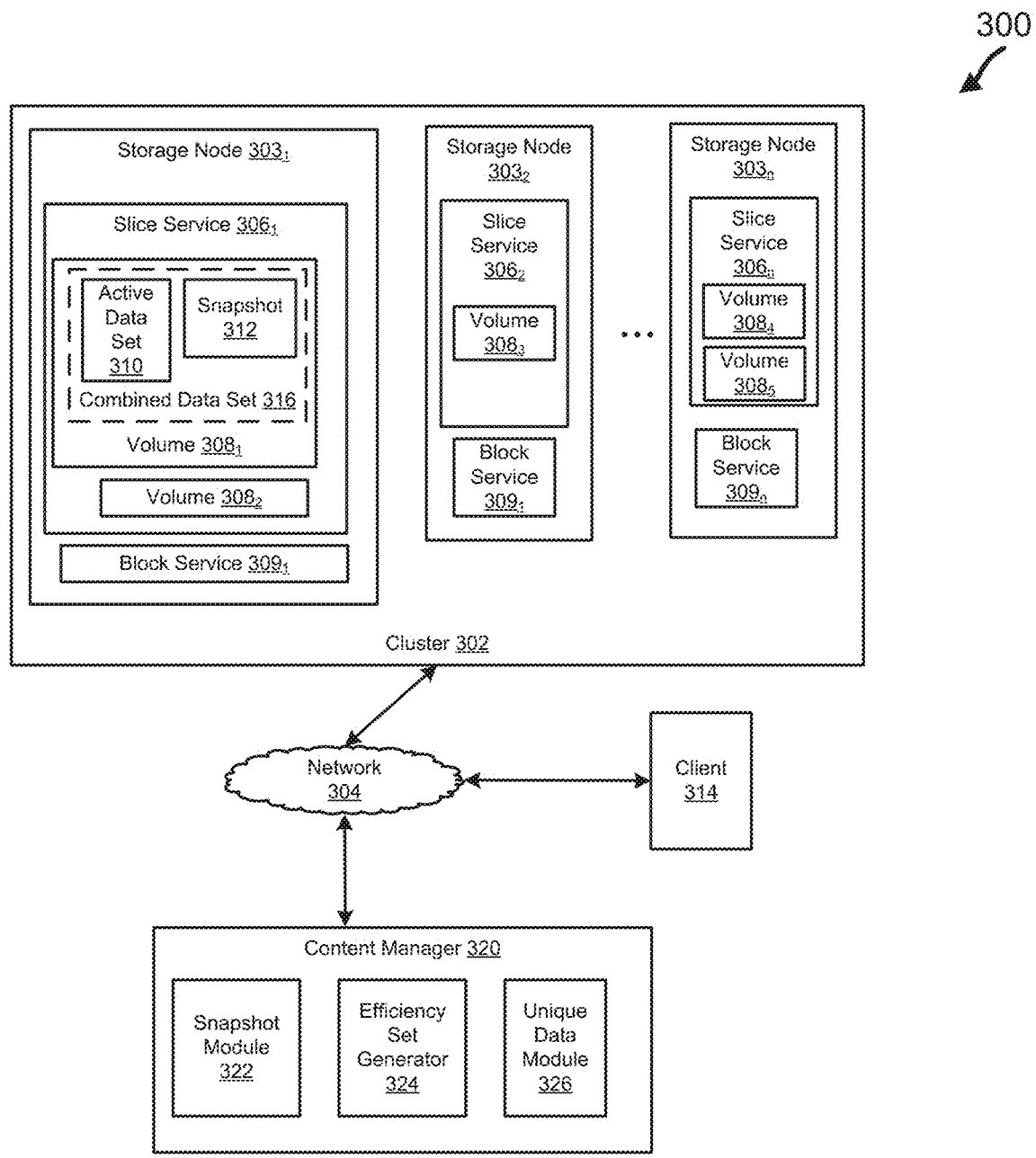
FIG. 3 illustrates a system including a cluster of storage nodes coupled to a content manager that determines an amount of unique data stored in the cluster according to one or more aspects of the present disclosure.

FIG. 3 illustrates a system 300 including a cluster 302 of storage nodes 303 coupled to a content manager 320 that determines an amount of unique data stored in the cluster 302 according to one or more aspects of the present disclosure. The cluster 302 includes a plurality of storage nodes 303, and each storage node 303 may include one or more slice services 306 as well as one or more block services 309. One or more volumes 308 may be maintained by a slice service 306.

A client 314 may correspond to the client 108, the slice services 306 may correspond to the metadata server 110, and the block service 309 may correspond to the block server 112 illustrated in FIG. 1. The client 314 may store data to, retrieve data from, and/or modify data stored at the cluster 302. Each client 314 may be associated with a volume. In some examples, only one client 314 accesses data in a volume. In some examples, multiple clients 314 may access data in a single volume. The slice services 306 and/or the client 314 may break data into data blocks, such as discussed above with respect to FIGS. 1 and 2. Slice services 306 and block services 309 may maintain mappings between the client's address and the eventual physical location of the data block in respective storage media of one or more storage nodes 106. A volume includes these unique and uniformly random identifiers, and so a volume's data may also be evenly distributed throughout the cluster 302.

The slice services 306 may store metadata that maps between clients 314 and block services 309. For example, slice services 306 may map between the client addressing used by client(s) 314 (e.g., file names, object names, block numbers, etc. such as LBAs) and block layer addressing (e.g., block identifiers) used in block services 309. Further, block services 309 may map between the block layer addressing (e.g., block identifiers) and the physical location of the data block on one or more storage devices. The blocks may be organized within bins maintained by the block services 309 for storage on physical storage devices (e.g., SSDs).

The above structure allows storing of data evenly across the cluster of storage devices (e.g., SSDs). For each volume hosted by a slice service 306, a list of block identifiers may be stored with one block identifier for each logical block on the volume. Each volume may be replicated between one or more slice services 306 and/or storage nodes 303, and the slice services for each volume may be synchronized between each of the slice services hosting that volume. Accordingly, failover protection is provided in case a slice service 306 fails, such that access to each volume may continue during the failure condition.

In the example illustrated in FIG. 3, the cluster 302 may include a storage node $303_1$ including a slice service $306_1$, a storage node $303_2$ including a slice service $306_2$, and include a storage node $303_n$ including a slice service $306_n$. The slice service $306_1$ includes volumes $308_1$ and $308_2$, the slice service $306_2$ includes volume $308_3$, the slice service $306_n$ includes volumes $308_4$ and $308_5$. These are merely examples, and it should be understood that a storage node 303 may include any number of slice services (e.g., one or more slice services), and a slice service may include any number of volumes (e.g., one or more volumes).

The cluster 302 is coupled over a network 304 to the content manager 320, which includes a snapshot module 322, an efficiency set generator 324, and a unique data module 326. Although in the example illustrated in FIG. 3, the content manager 320 is illustrated as being separate from a storage node 303, in other examples, the content manager 320 may be incorporated in or housed on a storage node 303. The snapshot module 322 may capture one or more snapshots of a volume, the efficiency set generator 324 may generate one or more efficiency sets, and the unique data module 326 may determine an estimated amount of memory used for storing unique data of a data set stored at the volume or across a plurality of volumes. Each of the snapshot module 322, the efficiency set generator 324, and the unique data module 326 will be discussed in further detail below.

The client 314 may write data to the volume $308_1$, read data from the volume $308_1$, and/or delete data from the volume $308_1$. The volume $308_1$ may store a combined data set 316 including an active data set 310 and a snapshot 312. The active data set 310 represents a current and/or dynamic point-of-view of data stored at the volume $308_1$. For example, the client 314 may write data to the active data set 310, read data from the active data set 310, and/or delete data from the active data set 310. In contrast, the snapshot 312 represents a previous, frozen point-of-view of data stored at the volume $308_1$. For example, the client 314 may read data from the snapshot 312 but may be unable to write data to the snapshot 312. The snapshot 312 captures the state of the file system at a point in time (e.g., point-in-time copy of the metadata that represents the snapshot) and may be a read-only image of the volume $308_1$. The client 314 may perform an action that causes the snapshot module 322 to capture a snapshot of data stored at the volume $308_1$.

The active data set 310 and the snapshot 312 may share a subset of data. For example, if the client 314 performs an initial write of data blocks {A, B, C, D} to the active data set 310 and causes a snapshot 312 to be taken of the active data set 310, then the snapshot 312 references data blocks {A, B, C, D}. The active data set also references the data blocks {A, B, C, D}. The client 314 may overwrite the data block D by the data block E in the active data set 310, causing the active data set 310 to reference data blocks {A, B, C, E}. If the client 314 were to delete the snapshot 312, not all the data blocks {A, B, C, D} referenced by the snapshot 312 would be deleted. For example, if the snapshot(s) 312 consumed one Gigabyte of data, such deletion of the snapshot(s) 312 may not recover one Gigabyte of data because the active data set 310 and the snapshot(s) 312 may share data. Instead, because the active data set 310 and the snapshot 312 still share the data blocks {A, B, C} (e.g., even after the overwrite of data block D by data block E), these shared data blocks would remain stored in the distributed storage system and only data block {D} would be removed from the volume 308₁. Accordingly, in response to deleting the snapshot 312, the amount of storage space that it takes to store the single unique data block {D} would be recovered but the storage space for the three data blocks {A, B, C} would remain used. Accordingly, it may be difficult to determine an amount of data storage space that is recovered by deleting the snapshot 312.

It may be desirable to determine an amount of unique data of the snapshot taking into consideration the data stored in the volume 308₁. By determining the unique data of a data set stored at the cluster 302, the content manager 320 may provide the client 314 with more insight into how the deletion of the data set (e.g., snapshot 312) affects memory usage and recovery. In some aspects, the content manager 320 uses efficiency sets to determine an estimated amount of memory used for storing unique data of a data set stored at the cluster 302, as noted above and discussed in further detail below.

Figure 4:
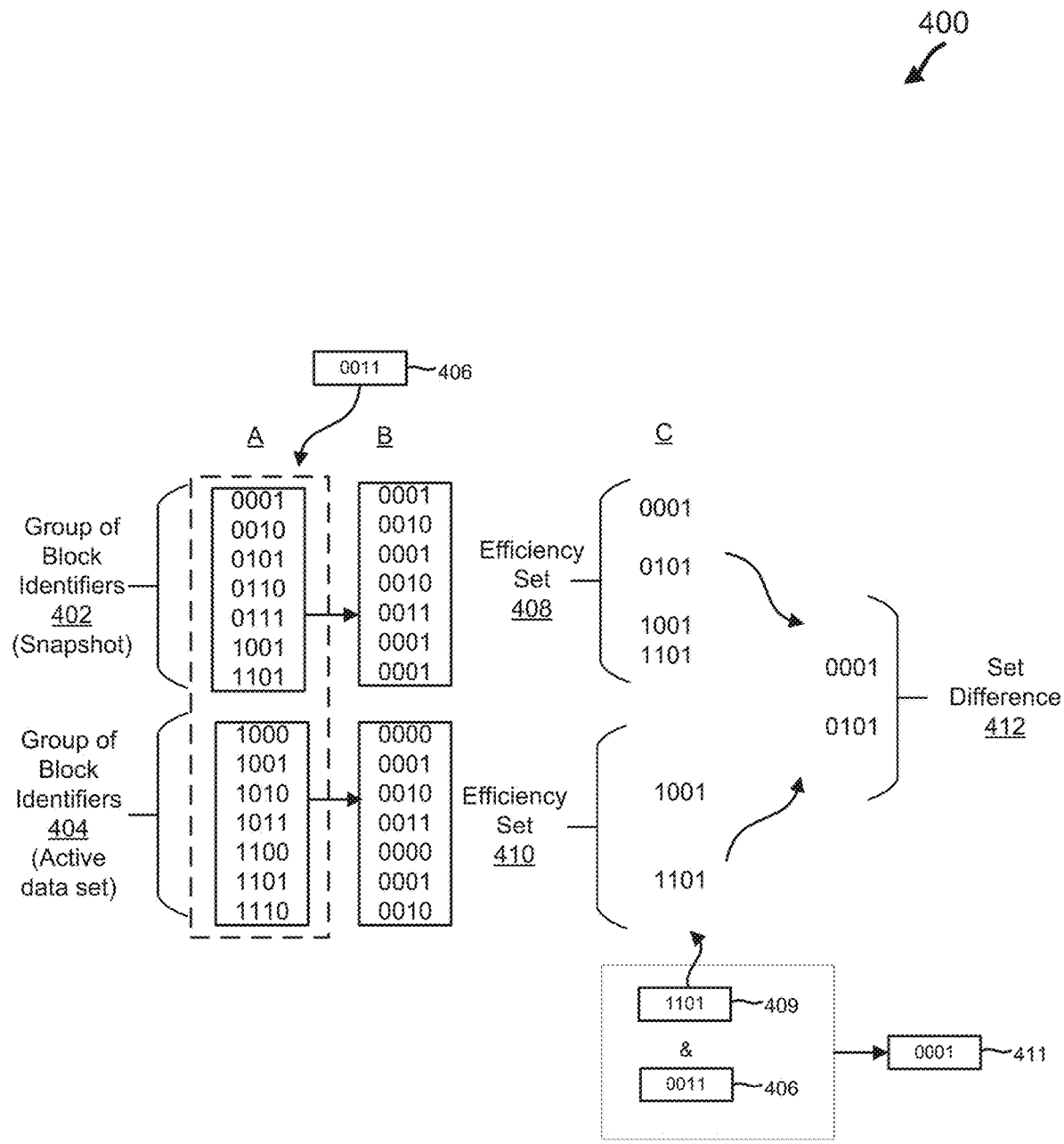
FIG. 4 illustrates example efficiency sets in accordance with one or more aspects of the present disclosure.

FIG. 4 illustrates example efficiency sets 400 in accordance with one or more aspects of the present disclosure. An efficiency set 408 may be generated from a group of block identifiers 402 of a snapshot corresponding to a first volume, and an efficiency set 410 may be generated from a group of block identifiers 404 of an active data set corresponding to a second volume. In an example, the snapshot corresponding to the group of block identifiers 402 may include the snapshot 312 in FIG. 3, and the active data set corresponding to the group of block identifiers 404 may include an active data set in volume 308₂ in FIG. 3. A snapshot acts as a collection of volumes that is counted as one volume from a logical point-of-view. For explanatory purposes, block identifiers are shown as 4-digit binary numbers. However, any of the block identifiers as described herein may be utilized.

In column A, the group of block identifiers 402 includes the block identifiers for the snapshot 312 corresponding to data blocks of, for example, the volume 308₁. In other words, the group of block identifiers 402 corresponds to the data blocks of the snapshot 312 stored at the volume 308₁. Additionally, the group of block identifiers 404 includes the block identifiers for the active data set corresponding to data blocks of, for example, the volume 308₂. In other words, the group of block identifiers 404 corresponds to the data blocks of the active data set stored at the volume 308₂.

The efficiency set generator 324 may apply a bitmask 406 to the group of block identifiers 402 and 404. In the example illustrated in FIG. 4, the bitmask 406 is "0011," and the two most significant bits of the block identifiers are masked to become "0" (i.e., a bitwise AND of the value "0" has been applied to the first and second most significant bits of each identifier). The scope of the present disclosure is not limited to a particular type of mask to be applied to groups of block identifiers. For example, any one of the bits of the binary representation of a block identifier may be masked to be set on or off, and multiple bits may be masked at the same time. In an illustrative implementation, the type of mask to be applied may be selected based on the desired probability of accuracy (e.g., confidence) an administrator desires in a resulting efficiency set and in calculations using the efficiency set. For example, as more bits are masked, the effective level of precision of the bit identifiers is reduced, and the probability that the group of masked bit identifiers is an accurate representation of volume data is reduced. The block identifiers in column A may also be referred to as candidate block identifiers. A candidate block identifier is a candidate for selection into an efficiency set.

In the present disclosure, "&" represents the bitwise AND operation, and the efficiency set generator 324 applies the bitmask 406 to each of the block IDs in column A. Column B shows the result of the bitwise AND operation. For example, referring to the first row of the group of identifiers 402 of column A, a result of (block ID "0001" & bitmask 406 "0011") yields the masked block ID "0001" shown in the first row of column B; referring to the second row of the group of identifiers 402 of column A, a result of (block ID "0010" & bitmask 406 "0011") yields the masked block ID "0010" shown in the second row of column B; and so on. In column B, the third row includes "0001", the fourth row includes "0010", the fifth row includes "0011", the sixth row includes "0001", and the seventh row includes "0001."

Referring to the first row of the group of identifiers 404 of column A, a result of (block identifier "1000" & bitmask 406 "0011") yields the masked block ID "0000" shown in the eighth row of column B; referring to the second row of the group of identifiers 404 of column A, a result of (block identifier "1001" & bitmask 406 "0011") yields the masked block identifier "0001" shown in the ninth row of column B; and so on. In column B, the tenth row includes "0010", the eleventh row includes "0011", the eleventh row includes "0000", the thirteenth row includes "0001", and the fourteenth row includes "0010."

The efficiency set generator 324 may obtain a comparison block identifier 409, which may be an arbitrary block identifier. In an example, the efficiency set generator 324 generates the comparison block identifier 409. In another example, the efficiency set generator 324 receives the comparison block identifier 409 from another entity. A length of the comparison block identifier 409 may be the same length as the candidate block identifiers in column A. The efficiency set generator 324 applies the bitmask 406 to the comparison block identifier 409 to yield a masked comparison block identifier 411. In the example illustrated in FIG. 4, a result of (comparison block identifier 409 "1101" & bitmask 406 "0011") yields the masked comparison block identifier 411 "0001".

The efficiency set generator 324 compares each of the masked block identifiers in column B and the masked comparison block identifier 411 "0001" and determines whether they match. If a masked block identifier in column B matches the masked comparison block identifier 411 "0001", then the efficiency set generator 324 may insert the unmasked block identifier in column A corresponding to the masked block identifier in column B into the efficiency set. An unmasked block identifier in column A corresponds to a masked block identifier in column B if a result of the applying the bitwise AND operator to the unmasked block identifier in column A results in the masked block identifier in column B.

The first, third, sixth, and seventh rows of column B include "0001", which matches the masked comparison block identifier 411 "0001". Accordingly, the efficiency set generator 324 may insert the unmasked block identifier "0001" in the first row of column A corresponding to the first row of column B, the unmasked block identifier "0101" in the third row of column A corresponding to the third row of column B, unmasked block identifier "1001" in the sixth row of column A corresponding to the sixth row of column B, and the unmasked block identifier "1101" in the seventh row of column A corresponding to the seventh row of column B into the efficiency set 408. The resulting efficiency set 408 may be seen with reference to column C.

Additionally, the ninth and thirteenth rows of column B include "0001", which matches the masked comparison block identifier 411 "0001". Accordingly, the efficiency set generator 324 may insert the unmasked block identifier "1001" in the second row of column A corresponding to the ninth row of column B and the unmasked block identifier "1101" in the thirteenth row of column A corresponding to the thirteenth row of column B into the efficiency set 410. The resulting efficiency set 410 may be seen with reference to column C.

The efficiency set 408 includes unmasked block identifiers "0001", "0101", "1001", and "1101" corresponding to the group of block identifiers 402, and the efficiency set 410 includes unmasked block identifiers "1001" and "1101" corresponding to the group of block identifiers 404. The unique data module 326 may determine which block identifiers from the efficiency sets 408 and 410 to include in a set difference 412. The set difference 412 includes block identifiers that are included in the efficiency set 408 but are not included in the efficiency set 410. For example, the unmasked block identifiers "1001" and "1101" are included in both efficiency sets 408 and 410. Additionally, the unmasked block identifiers "0001" and "0101" are included in the efficiency set 408 but are not included (are absent from) the efficiency set 410. Accordingly, the unique data module 326 may determine that the set difference 412 includes the unmasked block identifiers "0001" and "0101".

The bitmask 406 may also be referred to as a filter (e.g., when considered in cooperation with the result of a comparison block identifier, in view of the combination of the two being used to determine which candidate block identifiers are added to the efficiency set and which are not). The bitmask 406 may remove, for example, half of all candidate block identifiers from consideration in the efficiency set, with each bit used in the filter. For example, at level zero (e.g., filter is a level-zero filter), all candidate block identifiers are included in the efficiency set, and the number of blocks being estimated (e.g., the unique blocks in the volume or collection of volumes, etc.) is the number of blocks in the efficiency set. In another example, at level one (e.g., filter is a level-one filter), half the block identifiers are excluded. Accordingly, the estimated number of block identifiers is two times the number of elements in the set. In another example, at level two (e.g., filter is a level-two filter), another half of the block identifiers are thrown out. Accordingly, the estimate for the total number of unique blocks may be four times the number of elements in the set. In general, the total number of unique blocks on the volumes being considered may be the number of elements in the set multiplied by $2^n$, where n is the filter level. In other words, the content manger 320 multiplies by two for each bit applied in the filter.

In some examples, the efficiency set generator 324 may create each efficiency set by scanning all block IDs from a data volume, applying a membership test (e.g., applying the bitmask), and adding those block IDs that passed the membership test. The membership test may become stricter as the scan proceeds, applying retroactively to previously admitted block IDs. The size of the set of block IDs at the end of the scan may represent a fraction of the total number of data blocks in the system referenced by that volume (or, equivalently, by a collection of volumes, if that scan extends over multiple volumes), and that fraction may be determined by the membership test (e.g., the bitmask). The content manager 320 may multiply by the inverse of that fraction, yielding a statistical estimate of the total number of unique data blocks referenced by the volume (or set of volumes).

The unique data module 326 may compute the set difference 412 based on the efficiency set 408 for the snapshot 312 corresponding to the volume $308_1$ in FIG. 3 and the efficiency set 410 for the active data set corresponding to the volume $308_2$ in FIG. 3. For example, the unique data module 326 may subtract the efficiency set 410 from the efficiency set 408 to determine the set difference 412. In the example illustrated in FIG. 4, the set difference 412 includes two entries, each entry corresponding to a unique data block of the snapshot 312 (in FIG. 3). In other words, an entry of the set difference 312 corresponds to a unique data block that is included in the snapshot 312 corresponding to the volume $308_1$ but is not included in the active data set corresponding to the volume $308_2$ in FIG. 3. If the client 314 were to delete the snapshot 312, the unique data blocks corresponding to the block identifiers in the set difference 412 would be deleted.

The unique data module 326 may estimate, based on a number of entries in the set difference 412, an amount of memory used for storing unique data of the snapshot 312. For example, for each block identifier included in the efficiency set 412, the unique data module 326 may determine an amount of data that is referenced by the block identifier. To determine an amount of memory used for storing data that is in-use in the cluster 302, the content manager 320 may continue to perform these calculations for each data set/volume hosted on a slice service and further for each slice service in the cluster, as will be further discussed herein. The unique data module 326 may estimate, based on the set difference 412, an amount of memory used for storing unique data of the snapshot 312, the unique data being referenced by the snapshot 312 corresponding to the volume $308_1$ but not referenced by the active data set corresponding to the volume $308_2$ in FIG. 3. The total number of unique data blocks may correspond to the estimated amount of memory used for storing the unique data of the snapshot 312.

Although the group of block identifiers 402 has been described in the example of FIG. 4 as corresponding to a snapshot, and the group of block identifiers 404 has been described in the example as corresponding to an active data set, this is not intended to be limiting. For example, a data set corresponding to the group of block identifiers 402 may be any universal data set including a first subset of data and a second subset of data (e.g., a combined data set including a first subset of data and a second subset of data), and the group of block identifiers 404 may be any universe of data set (e.g., corresponding to the first subset of data). If the efficiency set generator 324 generates a first efficiency set for the combined data set and a second efficiency set for the first subset of data, then the set difference between the first and second efficiency sets (e.g., subtraction of the second efficiency set from the first efficiency set) would provide the block identifiers corresponding to the unique data blocks of the second subset of data. The unique data module 326 may estimate an amount of memory used for storing unique data blocks of the second subset of data based on the number of block identifiers included in the set difference, where the unique data blocks are referenced by the second subset of data but not referenced by the first subset of data.

Figure 5:
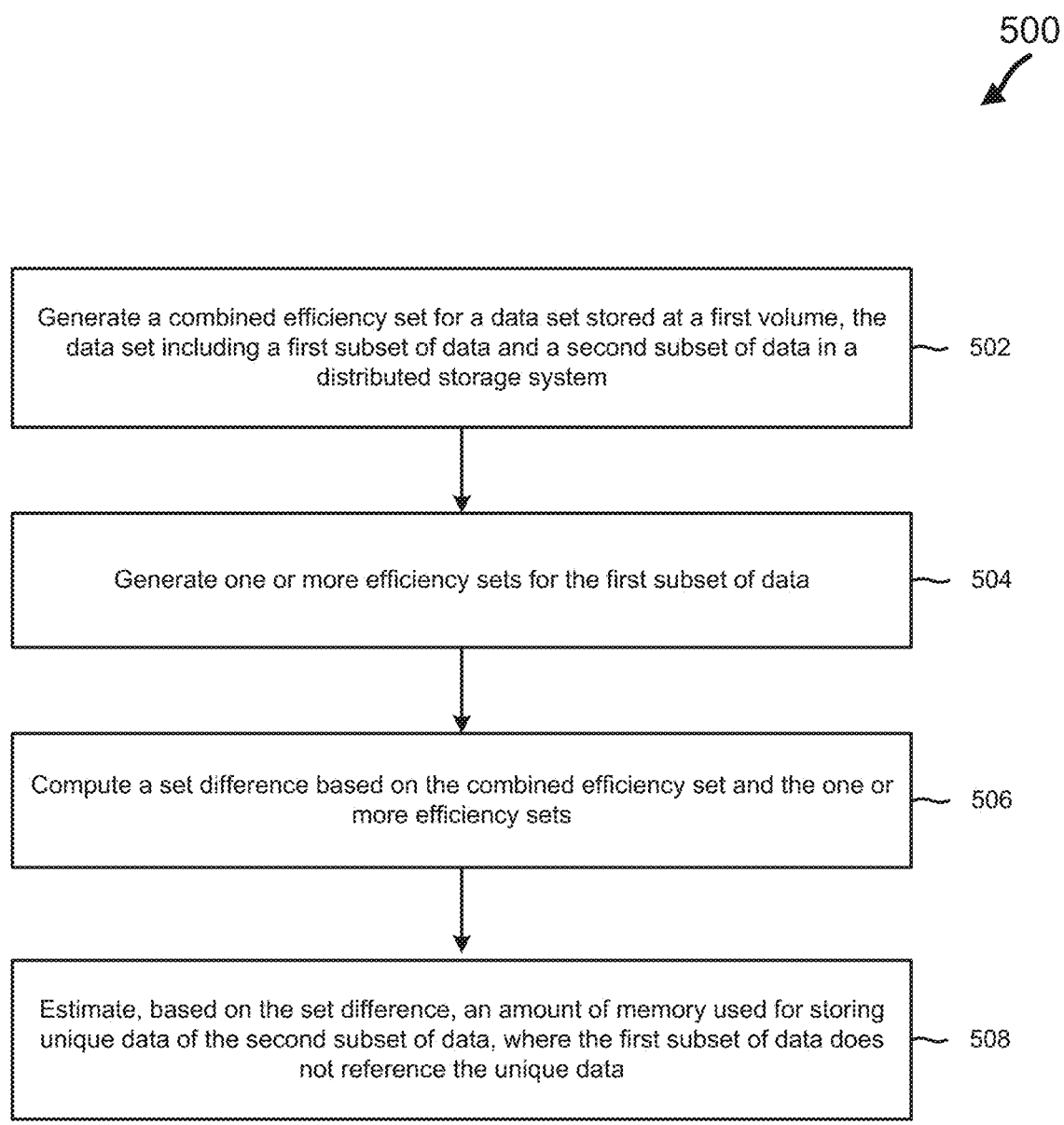
FIG. 5 illustrates a flow diagram of a method of determining a number of unique data blocks of the second subset of data according to one or more aspects of the present disclosure.

FIG. 5 illustrates a flow diagram of a method 500 of estimating an amount of memory used for storing a set of unique data blocks of the second subset of data according to one or more aspects of the present disclosure. Blocks of the method 500 can be executed by a computing device (e.g., a processor, processing circuit, and/or other suitable component, such as of a storage node 303). For example, the slice service 306 and/or the content manager 320 (e.g., one or more components, such as the snapshot module 322, the efficiency set generator 324, and/or the unique data module 326) may execute one or more blocks of the method 500. As illustrated, the method 500 includes a number of enumerated blocks, but embodiments of the method 500 may include additional blocks before, after, and in between the enumerated blocks. In some embodiments, one or more of the enumerated blocks may be omitted or performed in a different order.

At block 502, the method 500 includes generating a combined efficiency set for a data set stored at a first volume, the data set including a first subset of data and a second subset of data in a distributed storage system. In an example, the efficiency set generator 324 generates the combined efficiency set for the data set stored at the first volume. In some aspects, the data set includes or is the combined data set 316, the first subset of data includes or is the active data set 310 stored at the volume 308₁, and the second subset of data includes or is a set of one or more snapshots 312 stored at the volume 308₁.

For example, the efficiency set generator 324 may generate the combined efficiency set as discussed in relation to aspects of FIG. 4. For example, the efficiency set generator 324 may generate the combined efficiency set for the combined data set 316 by applying a first mask to a first group of block identifiers to mask at least one bit of each block identifier of the first group of block identifiers, where each block identifier of the first group of block identifiers may be used to access a particular data block corresponding to the combined data set 316. Accordingly, the efficiency set generator 324 may determine a first group of masked block identifiers based on applying the first mask to the first group of block identifiers. Additionally, the efficiency set generator 324 may apply the first mask to a comparison block identifier (e.g., comparison block identifier 409 in FIG. 4) to determine a masked comparison block identifier (e.g., masked comparison block identifier 411 in FIG. 4). The efficiency set generator 324 may compare the first group of masked block identifiers and the masked comparison block identifier. If a masked block identifier of the first group of masked block identifiers matches the masked comparison block identifier, then the efficiency set generator 324 may determine that the unmasked block identifier corresponding to the masked block identifier of the first group of masked block identifiers is part of the applicable efficiency set (e.g., combined efficiency set). An unmasked block identifier corresponds to the masked block identifier if the efficiency set generator 324 applies the first mask to the unmasked block identifier to yield a result that is the masked block identifier.

At block 504, the method 500 includes generating one or more efficiency sets for the first subset of data. In an example, the efficiency set generator 324 generates the one or more efficiency sets for the first subset of data. For example, the efficiency set generator 324 may generate the one or more efficiency sets as discussed in relation to aspects of FIG. 4. The one or more efficiency sets may include an efficiency set for the active data set 310. The efficiency set generator 324 may generate the efficiency set for the active data set 310 by applying the first mask to a second group of block identifiers to mask at least one bit of each block identifier of the second group of block identifiers, where each block identifier of the second group of block identifiers may be used to access a particular data block corresponding to the active data set 310. Accordingly, the efficiency set generator 324 may determine a second group of masked block identifiers based on applying the first mask to the second group of block identifiers. Additionally, the efficiency set generator 324 may compare the second group of masked block identifiers and the masked comparison block identifier. If a masked block identifier of the second group of masked block identifiers matches the masked comparison block identifier, then the efficiency set generator 324 may determine that the unmasked block identifier corresponding to the masked block identifier of the second group of masked block identifiers is part of the applicable efficiency set (e.g., efficiency set for the first subset of data).

At block 506, the method 500 includes computing a set difference based on the combined efficiency set and the one or more efficiency sets. In an example, the unique data module 326 computes the set difference based on the combined efficiency set and the one or more efficiency sets, where a result of the set difference provides a result efficiency set for the unique data blocks. A data block may be considered a unique data block of the second subset of data relative to the first and second subsets of data if the data block is referenced by the second subset of data but not by the first subset of data.

The combined efficiency set for the combined data set 316 corresponds to data blocks {A, B, C, D, E, F, G, H} and may include a first group of unmasked block identifiers, and the one or more efficiency sets for the active data set 310 corresponds to data blocks {A, B, H, G, F} and may include a second group of unmasked block identifiers.

In this example, the one or more efficiency sets discussed relative to block 504 includes one efficiency set, which is a subset of the combined efficiency set. The unique data module 326 may determine the set difference based on the combined efficiency set and the one or more efficiency sets by using set subtraction to subtract the one or more efficiency sets from the combined efficiency set. In other words, a result of set subtraction (e.g., Set 1–Set 2) may result in all elements in Set 1 that are not in Set 2 (e.g., the elements of the snapshot 312 that are not in the active data set 310 following the example above).

The unique data module 326 may compute the following Equation (1) to estimate an amount of memory used for storing unique data of the snapshot 312:

$$\text{EfficiencySet}_{combined} - \text{EfficiencySet}_{firstDataSet} = \text{EfficiencySet}_{SecondDataSet} \quad \text{Eq. (1)},$$

where $\text{EfficiencySet}_{combined}$ represents the efficiency set for the combined data set including a first subset of data and a second subset of data, $\text{EfficiencySet}_{firstDataSet}$ represents the efficiency set for the first subset of data, and $\text{EfficiencySet}_{secondDataSet}$ represents the efficiency set for the unique data of the second subset of data taking into consideration, for example, the data stored in the combined data set.

In an example, the first subset of data includes an active data set, and the second subset of data includes a snapshot. Accordingly, the unique data module 326 may compute the set difference based on the combined efficiency set and the one or more efficiency sets, where a result of the set difference is an efficiency set corresponding to the unique data blocks {C, D, E} (e.g., {A, B, C, D, E, F, G, H}−{A, B, H, G, F}={C, D, E}). The result set difference may include the second group of unmasked block identifiers subtracted from the first group of masked block identifiers discussed above in relation to data blocks {A, B, C, D, E, F, G, H} and data blocks {A, B, H, G, F}.

At block 508, the method 500 includes estimating, based on the set difference, an amount of memory used for storing unique data of the second subset of data, where the first subset of data does not reference the unique data. In an example, the unique data module 326 estimates, based on the set difference, the amount of memory used for storing unique data of the second subset of data relative to the first and second subsets of data. A unique data block of the second subset of data is a data block that is referenced by the second subset of data but is not referenced by the first subset of data.

In some aspects, if the client 314 deletes the second subset of data (e.g., the snapshot) from the volume (e.g., volume $308_1$), then the unique data module 326 may determine the amount of memory space that would be recovered based on the delete operation, in accordance with Equation (2):

$$(\text{Number}_{uniqueDataBlocks})*2^{n}*(\text{ave\_block\_size}_{uniqueDataBlocks}) \quad \text{Eq. (2),}$$

where $\text{Number}_{uniqueDataBlocks}$ represents the number of unique data blocks of the second subset of data, n represents the number of bits included in a bitmask that is applied to a set of block identifiers referencing the second subset of data, and $\text{ave\_block\_size}_{uniqueDataBlocks}$ represents the average block size of the unique data blocks. For example, if a bitmask that is applied to a set of block identifiers referencing a subset of data (e.g., the second subset of data) includes two bits, the unique data module 326 may keep one in four unique block identifiers from the original data in the efficiency set. Accordingly, the unique data module 326 may estimate that the original data had four times as many block identifiers in it.

Figure 6A:
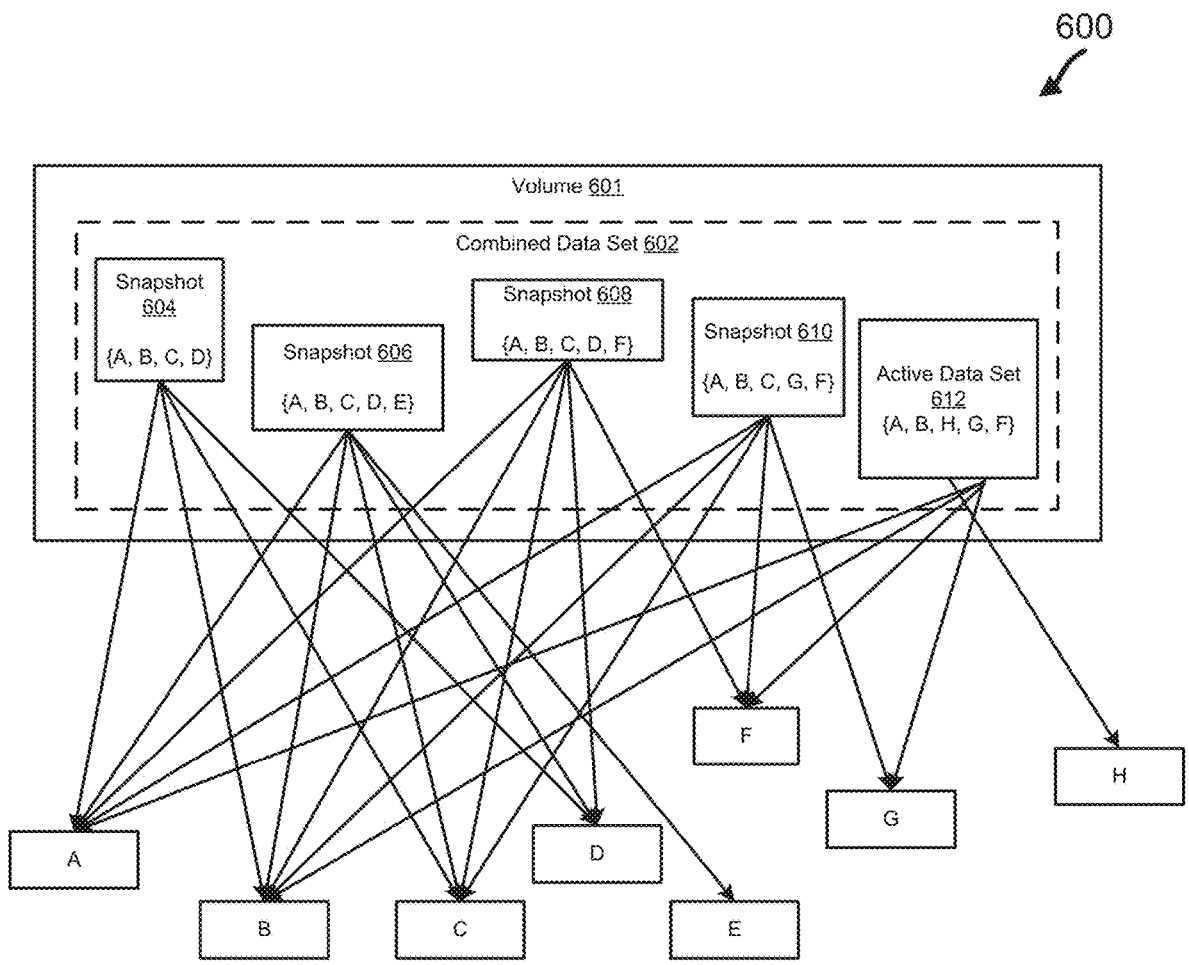
FIGS. 6A and 6B illustrate a block diagram of a set of snapshots and an active data set in accordance with one or more aspects of the present disclosure.
Figure 6B:
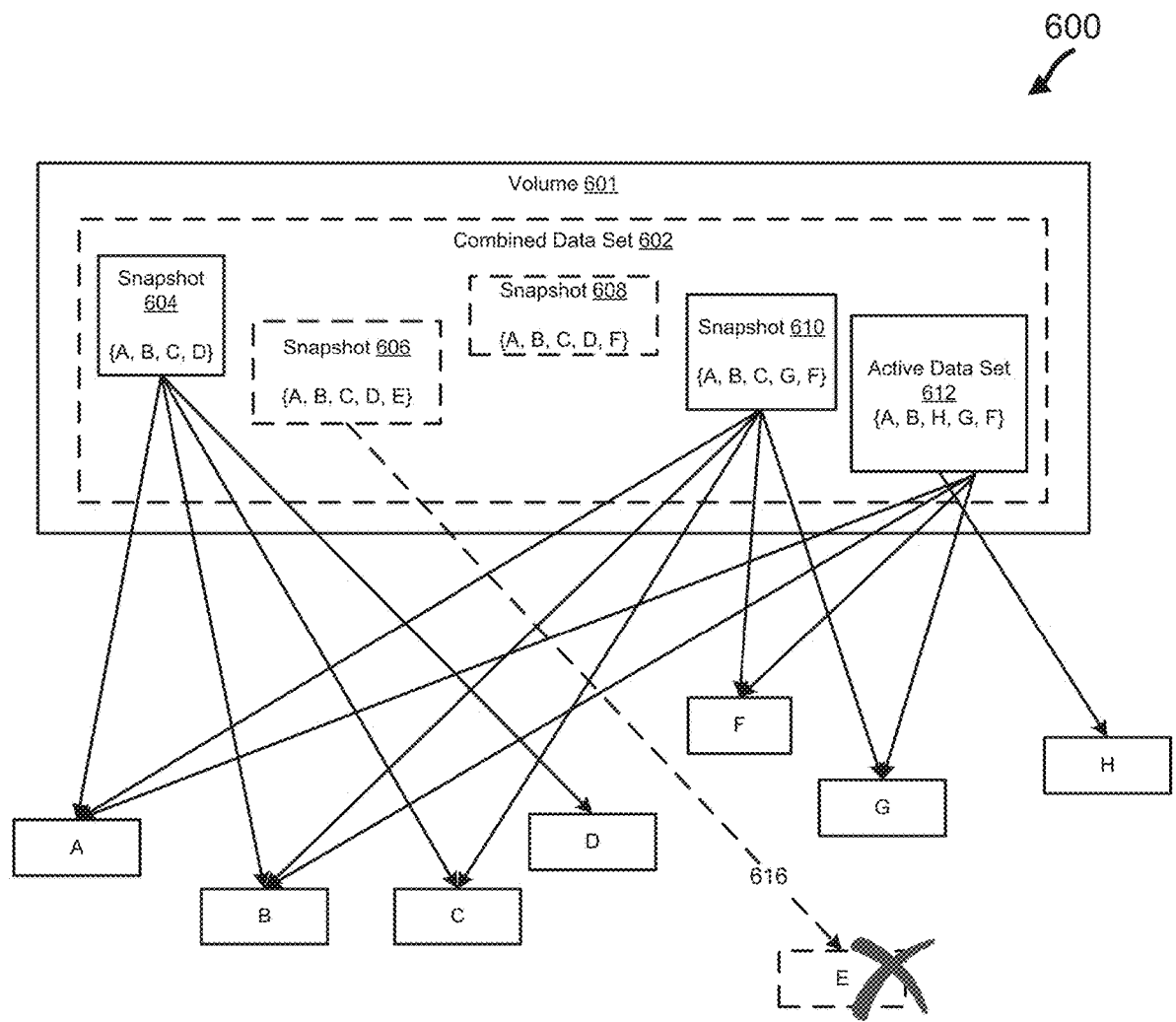

FIGS. 6A and 6B illustrate a block diagram 600 of a set of snapshots and an active data set in accordance with one or more aspects of the present disclosure. In FIG. 6A, a volume 601 stores a combined data set 602 including a set of snapshots and an active data set 612. The set of snapshots includes a snapshot 604, a snapshot 606, a snapshot 608, and a snapshot 610. The content manager 320 may determine or estimate an amount of memory used for storing unique data of one or more of the snapshots relative to the set of snapshots and the active data set. The amount of memory used for storing the unique data may refer to an amount of memory that is recovered by removing one or more data objects (e.g., particular snapshots).

In an example, the client 314 may initially write data blocks {A, B, C, D} to the active data set 612. The client 314 may cause the snapshot module 322 to generate the snapshot 604 of the active data set referencing the data blocks {A, B, C, D}. Accordingly, the snapshot 604 references data blocks {A, B, C, D}, as shown by the arrows to the applicable data blocks. The client 314 may write data block {E} into the active data set and cause the snapshot module 322 to generate the snapshot 606 of the active data set referencing data blocks {A, B, C, D, E}. Accordingly, the snapshot 606 references data blocks {A, B, C, D, E}, as shown by the arrows to the applicable data blocks. The snapshots 604 and 606 share the data blocks {A, B, C, D}, but not the new data block {E} in the distributed storage system. If a data block is shared between two snapshots or between a snapshot and an active data set, the data block is stored once and referenced by the two snapshots or by the snapshot and the active data set, respectively.

The client 314 may overwrite data block {E} by data block {F} in the active data set and cause the snapshot module 322 to generate the snapshot 608 of the active data set referencing the data blocks {A, B, C, D, F}. Accordingly, the snapshot 608 references data blocks {A, B, C, D, F}, as shown by the arrows to the applicable data blocks. The client 314 may overwrite data block {D} by data block {G} in the active data set and cause the snapshot module 322 to generate the snapshot 610 of the active data set referencing data blocks {A, B, C, G, F}. Accordingly, the snapshot 610 references data blocks {A, B, C, G, F}, as shown by the arrows to the applicable data blocks. The client 314 may overwrite data block {C} by data block {H} in the active data set. Accordingly, the active data set 612 references data blocks {A, B, H, G, F}, as shown by the arrows to the applicable data blocks.

In some aspects, the efficiency set generator 324 may generate efficiency sets at the level of individual snapshots as well as combined for all snapshots on a given volume. For example, the efficiency set generator 324 may generate a combined efficiency set for the combined data set 602, which includes the snapshots 604, 606, 608, and 610 and the active data set 612. The combined efficiency set may include a first group of unmasked block identifiers corresponding to the combined data set 602. For example, the efficiency set generator 324 may generate the combined efficiency set in accordance with details discussed relative to FIG. 4.

In an example, the set of snapshots may be partitioned into a first subset of snapshots and a second subset of snapshots. To determine an amount of memory recovered or memory savings based on deletion of the second subset of snapshots, the unique data module 326 may determine a set difference by subtracting the efficiency set for the active data set 612 and an efficiency set for the first subset of snapshots from the combined efficiency set for the combined data set 602. For example, to determine an amount of memory recovered or memory savings based on deleting the snapshots 606 and 608, the unique data module 326 may determine a set difference by subtracting the efficiency set for the active data set 612 and an efficiency set for each of the remaining snapshots (e.g., an efficiency set for the snapshot 604 and the efficiency set for the snapshot 610) from the combined efficiency set for the combined data set 602 (e.g., Efficiency set for data blocks {A, B, C, D, E, F, G, H}−Efficiency set for data blocks {A, B, C, D}−Efficiency set for data blocks {A, B, C, G, F}=Efficiency set for data block {E}). Accordingly, the unique data module 326 may determine a resulting efficiency set for data block {E}. This represents the amount of data that may actually be deleted from the storage device(s) when deleting the second subset of snapshots (meaning that the non-unique data remains because one or more of the remaining snapshots and/or active data set may still be referencing it).

FIG. 6B illustrates the snapshots 606 and 608 that are removed from the distributed storage system, as shown by the dashed lines. The arrows referencing the data blocks from the removed snapshots 606 and 608 are also removed, except for a dashed line 616 referencing the unique data block {E}. The unique data module 326 may determine that the data block {E} is a unique data block of the snapshots 606 and 608 relative to or taking into consideration the data (e.g., the other snapshots 602, 604, and 610 and active data set 612) stored in the volume 601. In other words, if the client 314 were to delete the snapshots 606 and 608, the client 314 may recover the amount of memory used for storing the data block {E}. The content manager 320 may remove the unique data (e.g., data block {E}) from the distributed storage system in response to a request (e.g., client request) to remove the snapshots 606 and 608, where a difference between the snapshots 606 and 608 and the unique data remain used in the distributed storage system after completing the request to remove the snapshots 606 and 608. In this example, the other data blocks referenced by the snapshots 606 and 608 (e.g., data blocks {A, B, C, D, F}) would remain used in the system because they are shared with another snapshot(s) that remains stored in the distributed storage system and/or shared with the active data set 612.

In FIGS. 6A and 6B, the content manager 320 generates efficiency sets at the volume level, the active data set level, and the snapshot(s) level. In some aspects, the content manager 320 may combine efficiency sets across an entire account to view multiple volumes in the account. An account may represent a partition type of the volumes, and each volume may be in exactly one account. A collection of volumes in a cluster may be associated with a particular client account, and the content manager 320 may determine an efficiency set for each volume of the collection and then generate a combined efficiency set for the cluster by combining (e.g., creating a union) the efficiency sets for the volumes. The content manager 320 may determine an amount of memory used for storing unique data of a subset of volumes, where the amount of memory may correspond to an amount of memory space that is recovered if the subset of volumes were deleted from the cluster.

Figure 7:
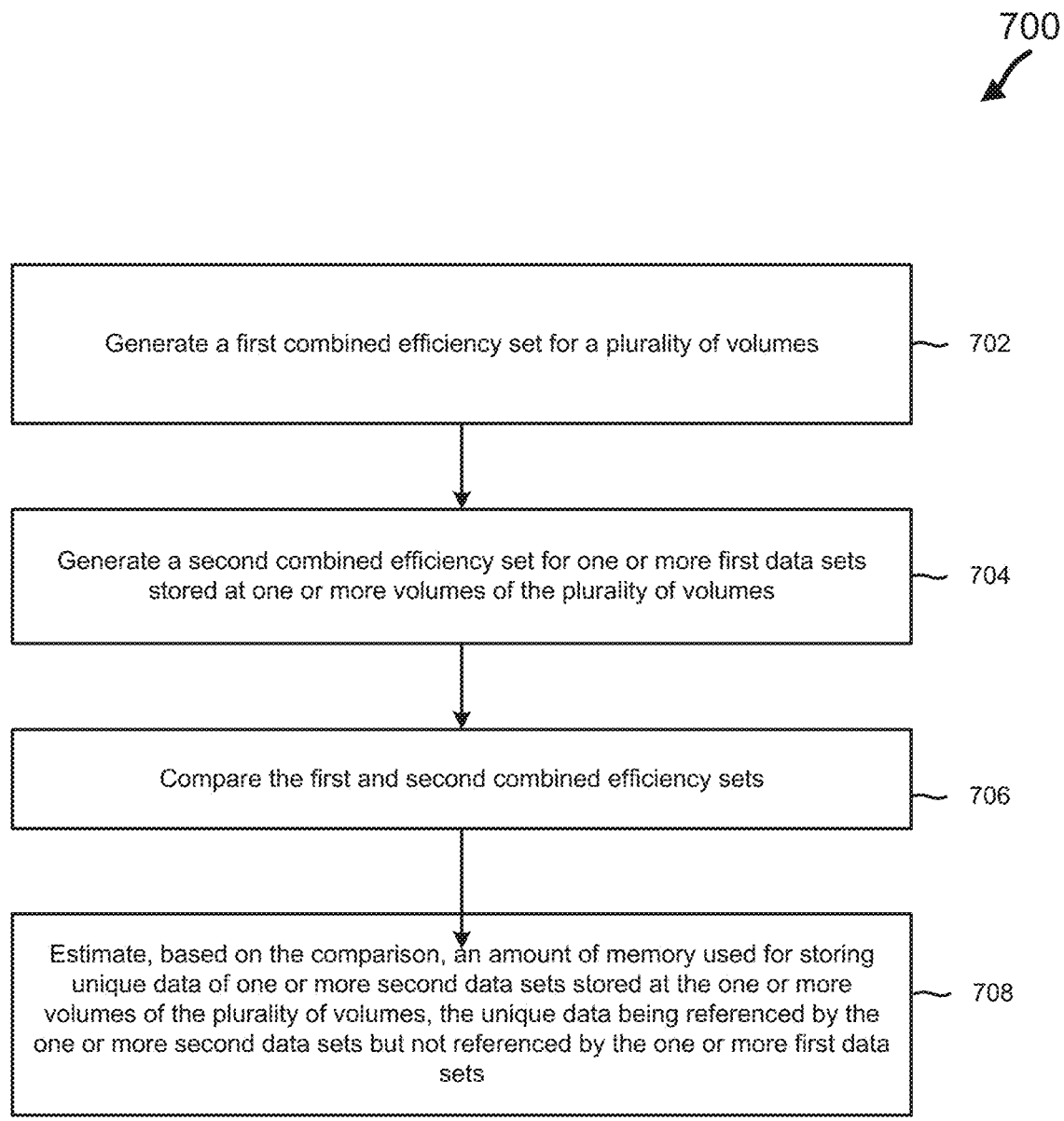
FIG. 7 illustrates a flow diagram of a method of determining a number of unique data blocks of a subset of volumes according to one or more aspects of the present disclosure.

FIG. 7 illustrates a flow diagram of a method 700 of determining an estimated amount of memory used for storing unique data blocks of a subset of volumes according to one or more aspects of the present disclosure. Blocks of the method 700 can be executed by a computing device (e.g., a processor, processing circuit, and/or other suitable component, such as of a storage node 303). For example, the slice service 306 and/or the content manager 320 (e.g., one or more components, such as the snapshot module 322, the efficiency set generator 324, and/or the unique data module 326) may execute one or more blocks of the method 700. As illustrated, the method 700 includes a number of enumerated blocks, but embodiments of the method 700 may include additional blocks before, after, and in between the enumerated blocks. In some embodiments, one or more of the enumerated blocks may be omitted or performed in a different order.

Figure 8A:
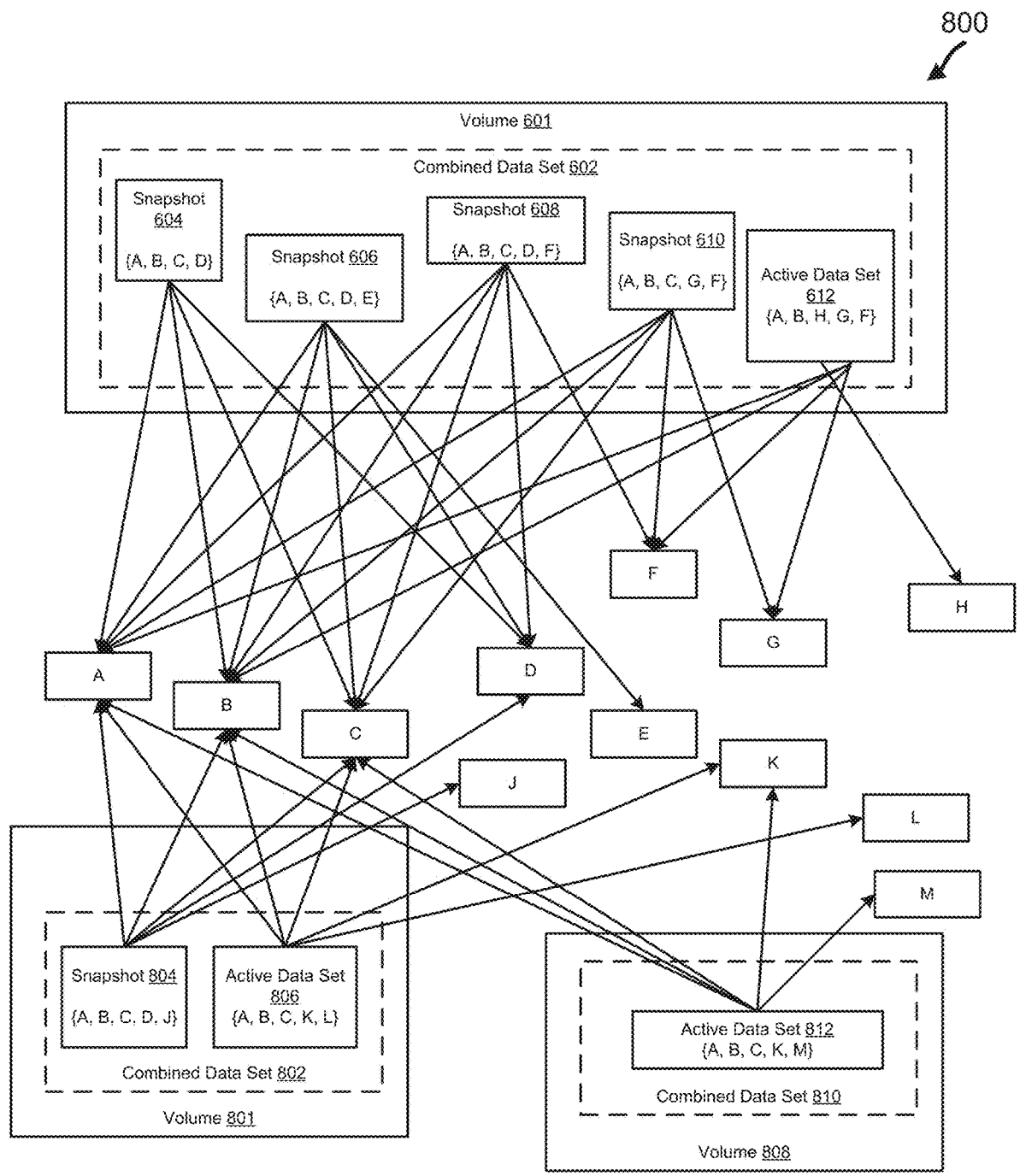
FIGS. 8A, 8B, and 8C illustrate a block diagram of a set of snapshots and an active data set across a plurality of volumes in accordance with one or more aspects of the present disclosure.
Figure 8B:
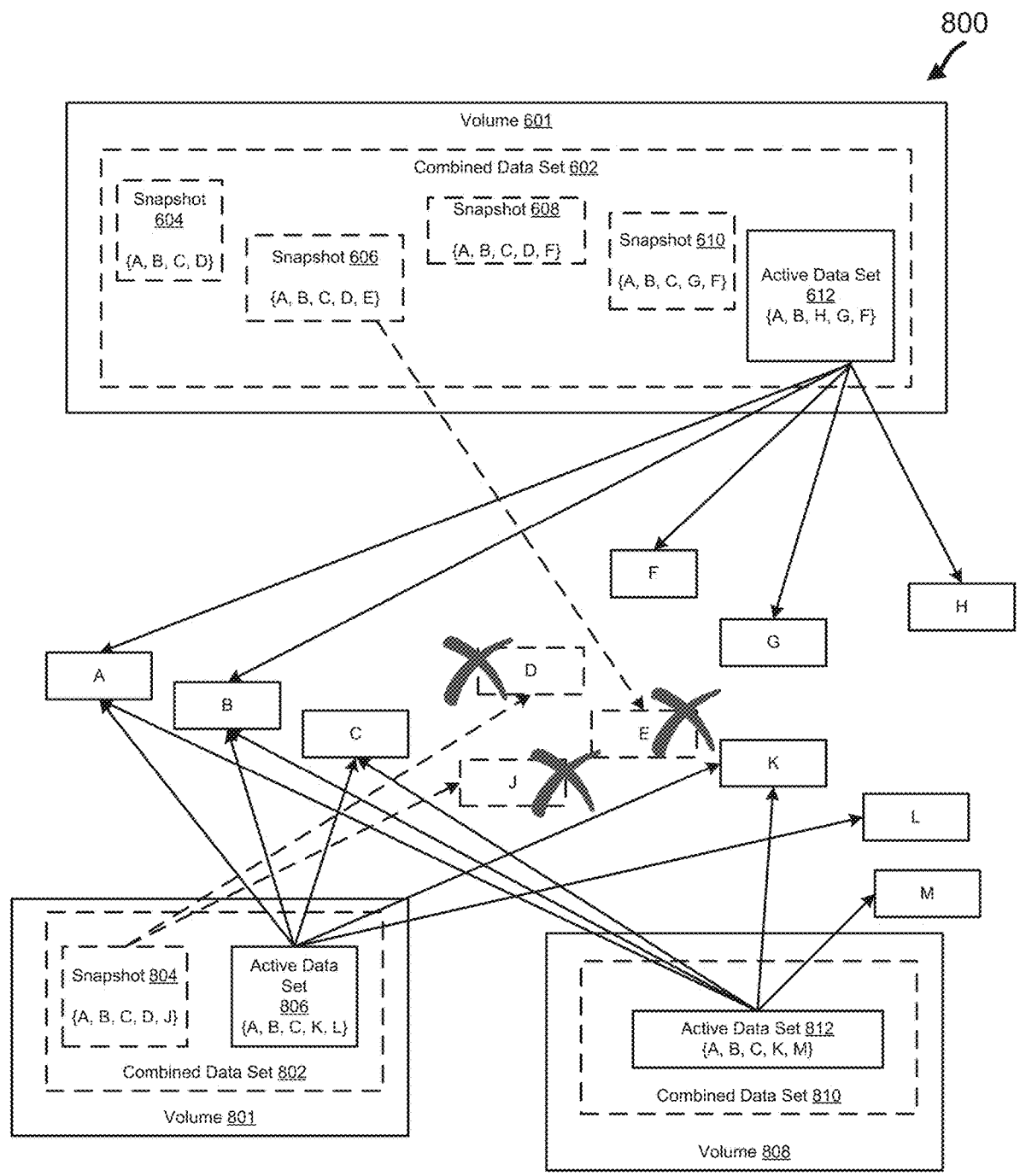

FIG. 7 will be discussed relative to FIGS. 8A and 8B (and vice versa) to better understand concepts related to determining an estimated amount of memory used for storing unique data blocks of a subset of volumes in a cluster. FIGS. 8A and 8B illustrate a block diagram 800 of a set of snapshots and an active data set across a plurality of volumes in accordance with one or more aspects of the present disclosure. FIG. 8A illustrates the volume 601 (e.g., continuing the example illustrated in FIG. 6A), a volume 801, and a volume 808. The content manager 320 may determine an amount of unique data (e.g., a set of snapshots) stored at one or more of the volumes 602, 801, and/or 808, the amount of unique data corresponding to an amount of memory that is recovered by deleting the unique data from the distributed storage system.

The volume 801 stores a combined data set 802 including a snapshot 804 and an active data set 806. For volume 801, the client 314 may initially write data blocks {A, B, C, D, J} to the active data set 806. The client 314 may cause the snapshot module 322 to generate the snapshot 804 of the active data set referencing data blocks {A, B, C, D, J}. Accordingly, the snapshot 804 references data blocks {A, B, C, D, J}, as shown by the arrows to the applicable data blocks. The client 314 may overwrite data block {D} by data block {K} and overwrite data block {J} by data block {L} in the active data set referencing data blocks {A, B, C, D, J}. Accordingly, the active data set 806 references data blocks {A, B, C, K, L}, as shown by the arrows to the applicable data blocks. The snapshot 804 and the active data set 806 share the data blocks {A, B, C} and accordingly each reference these data blocks. Additionally, the snapshot 804 and/or the active data set 806 share at least one data block with a snapshot 604, 606, 608, 610, or active data set 612 stored at the volume 601. If a data block is shared between two volumes (e.g., between two snapshots and or between a snapshot and an active data set of respective volumes), the data block is stored once and referenced by the two volumes.

The volume 808 stores an active data set 812. For volume 808, the client 314 may initially write data blocks {A, B, C, K, M} to the active data set 812. Accordingly, the active data set 810 references data blocks {A, B, C, K, M}, as shown by the arrows to the applicable data blocks. The active data set 810 shares at least one data block with the volume 601 and/or the volume 801.

Referring back to FIG. 7, at block 702, the method 700 includes generating a first combined efficiency set for a plurality of volumes. In an example, the efficiency set generator 324 generates the first combined efficiency set for the plurality of volumes including volumes 601, 801, and 802. The plurality of volumes may be associated with the same client account and/or included in a common cluster. For example, the efficiency set generator 324 may generate the first combined efficiency set for an entire client account.

The efficiency set generator 324 may generate the first combined efficiency set as discussed in relation to aspects of FIG. 4. For example, the efficiency set generator 324 may generate the first combined efficiency set by generating a first efficiency set for the volume 601, a second efficiency set for the volume 801, and a third efficiency set for the volume 808. As discussed above, the first efficiency set for the volume 601 may include a first group of masked block identifiers corresponding to data blocks {A, B, C, D, E, F, G, H} (e.g., corresponding to data blocks in snapshots and the active data set of the volume 601).

The efficiency set generator 324 may generate the second efficiency set for the volume 801 as discussed in relation to aspects of FIG. 4. For example, the efficiency set generator 324 may generate the second efficiency set by generating an efficiency set for the snapshot 804 corresponding to data blocks {A, B, C, D, J}, generating an efficiency set for the active data set 806 corresponding to data blocks {A, B, C, K, L}, and creating a union of the efficiency sets for the snapshot 804 and the active data set 801. Accordingly, the second efficiency set for the volume 801 may include a second group of unmasked block identifiers corresponding to data blocks {A, B, C, D, J, K, L}.

The efficiency set generator 324 may generate the third efficiency set for the volume 808 as discussed in relation to aspects of FIG. 4. For example, the efficiency set generator 324 may generate the third efficiency set by generating an efficiency set for the active data set 812 corresponding to data blocks {A, B, C, K, M}. Accordingly, the third efficiency set for the volume 808 may include a third group of unmasked block identifiers corresponding to data blocks {A, B, C, K, M}.

The efficiency set generator 324 may generate the first combined efficiency set for the volumes 601, 801, and 808 by creating a union of the first efficiency set for the volume 601, the second efficiency set for the volume 801, and the third efficiency set for the volume 808. Accordingly, the first combined efficiency set includes a fourth group of masked block identifiers corresponding to data blocks {A, B, C, D, E, F, G, H, J, K, L, M}.

At block 704, the method 700 includes generating a second combined efficiency set for one or more first data sets stored at one or more volumes of the plurality of volumes. In an example, the efficiency set generator 324 generates the second combined efficiency set. For example, the efficiency set generator 324 may generate the second combined efficiency set as discussed in relation to aspects of FIG. 4.

In some aspects, when comparing efficiency sets from different sources, the efficiency set generator 324 may use the same selection criteria (e.g., the same number of bits matched to the same mask along with the same comparison block identifier). If one of the sets has a less stringent criterion, the efficiency set generator 324 may apply the more stringent criterion to the set union, intersection, difference, etc., and for subsequent estimates based on that resulting efficiency set, the unique data module 326 takes into account the "n" value (in Eq. (2)) associated with that requirement.

In some aspects, the one or more first data sets includes the active data set 612 stored at the volume 601, the active data set 806 stored at the volume 801, and the active data set 812 stored at the volume 808. By generating the second combined efficiency set for these active data sets, the unique data module 326 may determine the unique data blocks that are referenced by other data sets that do not include these active data sets, such as other snapshots. The efficiency set generator 324 may generate the second combined efficiency set by generating a fourth efficiency set for the active data set 612, a fifth efficiency set for the active data set 806, and a sixth efficiency set for the active data set 812, and creating a union of the resulting efficiency sets. The efficiency set generator 324 may generate the fourth efficiency set for the active data set 612 as discussed in relation to aspects of FIG. 4. For example, the efficiency set generator 324 may generate the fourth efficiency set for the active data set 612 corresponding to data blocks {A, B, H, G, F}. Accordingly, the fourth efficiency set for the active data set 612 may include a fourth group of unmasked block identifiers corresponding to data blocks {A, B, H, G, F}. The efficiency set generator 324 may generate the fifth efficiency set for the active data set 806 corresponding to data blocks {A, B, C, D, J} and the sixth efficiency set for the active data set 812 corresponding to the data blocks {A, B, C, K, M} by performing actions similar to those discussed above in relation to aspects of FIG. 4.

At block 706, the method 700 includes comparing the first and second combined efficiency sets. In an example, the unique data module 326 may compare the first and second combined efficiency sets and determine a set difference based on the first and second combined efficiency sets. The set difference may indicate an amount of memory used for storing unique data of one or more second data sets stored at the one or more volumes of the plurality of volumes, the unique data being referenced by the one or more second data sets but not referenced by the one or more first data sets. Following the example of FIGS. 8A and 8B, the set difference may indicate an amount of unique data of the snapshots (e.g., corresponding to the "one or more second data sets") that are absent from the active data sets (e.g., corresponding to the "one or more first data sets") of the respective volumes.

At block 708, the method 700 includes estimating, based on the comparison, an amount of memory used for storing unique data of one or more second data sets stored at the one or more volumes of the plurality of volumes, the unique data being referenced by the one or more second data sets but not referenced by the one or more first data sets. In an example, the unique data module 326 may estimate, based on the comparison, the amount of memory used for storing the unique data of one or more second data sets stored at the one or more volumes of the plurality of volumes.

In keeping with the above example in which the one or more first data sets includes the active data set 612 stored at the volume 601, the active data set 806 stored at the volume 801, and the active data set 812 stored at the volume 808, the one or more second data sets may include the snapshots 604, 606, 608, and 610 stored at the volume 601 and the snapshot 804 stored at the volume 801. In this example, the unique data module 326 may determine an estimated amount of memory used for storing unique data of the snapshots 604, 606, 608, 610, and 804, where the estimated amount of memory indicates the amount of memory that would be recovered if the snapshots 604, 606, 608, 610, and 804 were deleted from the distributed storage system. For example, the unique data module 326 may estimate, based on the comparison, an amount of memory used for storing the unique data of one or more second data sets stored at the one or more volumes of the plurality of volume, in accordance with Equation (2) above.

FIG. 8B illustrates the snapshots 604, 606, 608, and 610 stored at the volume 601 and the snapshot 804 stored at the volume 801 that are removed from the distributed storage system, as shown by the dashed lines. The arrows referencing the data blocks from the removed snapshots 604, 606, 608, 610, and 804 are also removed, except for a dashed line referencing the unique data blocks {D, E, J}. The unique data module 326 may determine that the data blocks {D, E, J} are unique data blocks of the snapshots 604, 606, 608, 610, and 804 relative to the data stored at volumes 601, 801, and 808. In other words, if the client 314 were to delete the snapshots 604, 606, 608, 610, and 804, the client 314 may recover the amount of storage used to store the data blocks {D, E, J}. The content manager 320 may remove the unique data (e.g., data blocks {D, E, J}) from the distributed storage system in response to a request (e.g., client request) to remove the snapshots 604, 606, 608, 610, and 804, where a difference between the snapshots 604, 606, 608, 610, and 804 and the unique data remain used in the distributed storage system after completing the request to remove the snapshots 604, 606, 608, 610, and 804. In this example, the other data blocks referenced by the snapshots 604, 606, 608, 610, and 804 (e.g., data blocks {A, B, C, F, G, H, K, L, M}) would remain used in the system because they are shared with the active data set 612, the active data set 806, and/or the active data set 812. The unique data module 326 may estimate the amount of memory used for storing unique data of the snapshots across the plurality of volumes in accordance with, for example, Equation (2) above.

In FIGS. 8A and 8B, the content manager 320 generates efficiency sets at the volume level, the active data set level, the snapshot(s) level, and across volumes. Referring to FIGS. 7, 8A, and 8B, the content manager 320 may be described as estimating an amount of memory used for storing unique data of the snapshots stored across the plurality of volumes (e.g., the volumes 601, 801, and 808) or relative to the plurality of volumes. In some aspects, the content manager 320 may estimate an amount of memory used for storing unique data of a subset of the snapshots stored across the plurality of volumes. For example, if the client 314 desires to know how much memory would be recovered if the snapshot 610 stored at volume 601 and the snapshot 804 stored at volume 801 were removed, the efficiency set generator 324 may generate the first combined efficiency set for the plurality of volumes (see discussion above regarding block 702 in FIG. 7) and generate the second combined efficiency set for the other remaining snapshots (e.g., snapshots 604, 606, and 608 stored at volume 601) and the active data sets stored across the plurality of volumes (e.g., the volumes 601, 801, and 808). The unique data module 326 may compare the first and second combined efficiency sets and determine, based on the comparison, a set difference based on the first and second combined efficiency sets. The unique data module 326 may determine the set difference by subtracting the second combined efficiency set from the first combined efficiency set. The unique data module 326 may estimate, based on the set difference, an amount of memory used for storing the unique data of the snapshots 610 and 804, where the unique data is not referenced by the other snapshots or by the active data sets stored at the plurality of volumes. In other words, the snapshots 610 and 804 reference the unique data but the other snapshots and the active data sets stored at the plurality of volumes do not reference the unique data.

In some aspects, the unique data module 326 may estimate an amount of memory used for storing unique data of one or more volumes of the plurality of volumes. For example, referring to method 700 in FIG. 7, if the unique data module 326 estimates an amount of memory used for storing unique data of volume 601, then the one or more first data sets may include the data stored at the volumes 801 and 808 (see block 704), the plurality of volumes may include the volumes 601, 801, and 808 (see block 702), and the one or more second data sets may include the data stored at the volume 601 (see block 708). For example, referring to block 702, the efficiency set generator 324 may generate a first combined efficiency set for volumes 601, 801, and 808. As discussed above, the first combined efficiency set may include a group of unmasked block identifiers corresponding to data blocks {A, B, C, D, E, F, G, H, J, K, L, M}.

Referring to block 704, the efficiency set generator 324 may generate a second combined efficiency set for one or more first data sets stored at one or more volumes of the plurality of volumes. In an example, the efficiency set generator 324 may generate the second combined efficiency set by generating an efficiency set for the volume 801 and generating an efficiency set for the volume 808. As discussed above, the efficiency set for the volume 801 may include a group of unmasked block identifiers corresponding to data blocks {A, B, C, D, J, K, L}, and the efficiency set for the volume 808 may include a group of unmasked block identifiers corresponding to data blocks {A, B, C, K, M}.

Referring to block 706, the unique data module 326 may compare the first and second combined efficiency sets. In an example, the unique data module 326 may determine a set difference based on the first and second combined efficiency sets by subtracting the second combined efficiency set from the first combined efficiency set. In this example, the set difference may result in a result efficiency set corresponding to the volume 601. The result efficiency set may include a group of unmasked block identifiers corresponding to data blocks {E, F, G, H}.

Referring to block 708, the unique data module 326 may estimate, based on the comparison, an amount of memory used for storing unique data of one or more second data sets stored at the one or more volumes (e.g., data stored at volume 601) of the plurality of volumes, the unique data not being referenced by the one or more first data sets (e.g., data stored at volumes 801 and 808). For example, the unique data module 326 may estimate, based on the comparison, the amount of memory used for storing the unique data of one or more second data sets in accordance with Equation (2) above.

Figure 8C:
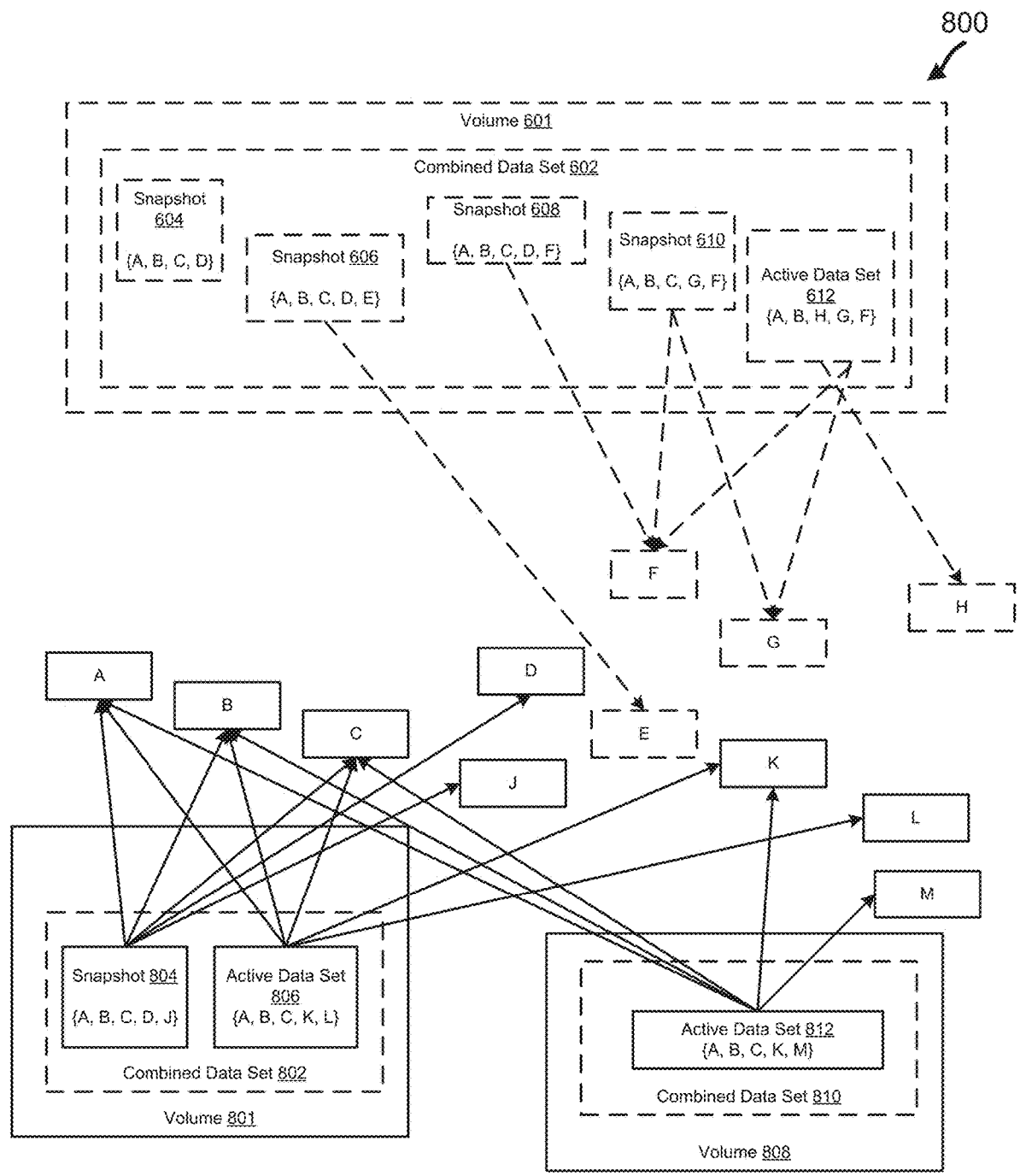

Following the example with respect to volume 601, FIG. 8C illustrates the volume 601 that is removed from the distributed storage system, as shown by the dashed lines. The arrows referencing the data blocks from the removed volume 601 are also removed, except for a dashed line referencing the unique data blocks {E, F, G, H}. The unique data module 326 may determine that the data blocks {E, F, G, H} are unique data blocks of the volume 601 taking into consideration or relative to the data stored across the plurality of volumes including volumes 601, 801, and 808. In other words, if the client 314 were to delete the volume 601, the client 314 may recover the amount of storage used to store the data blocks {E, F, G, H}. The content manager 320 may remove the unique data (e.g., data blocks {E, F, G, H}) from the distributed storage system in response to a request (e.g., client request) to remove the volume 601, where a difference between the data blocks referenced by the volume 601 and the unique data remain used in the distributed storage system after completing the request to remove the volume 601. In this example, the other data blocks included in the volumes 801 and 808 (e.g., data blocks {A, B, C, D, J, K, L, M}) would remain used in the system. Accordingly, the unique data module 326 may estimate an amount of storage space used by the unique data across the plurality of volumes.

Figure 9:
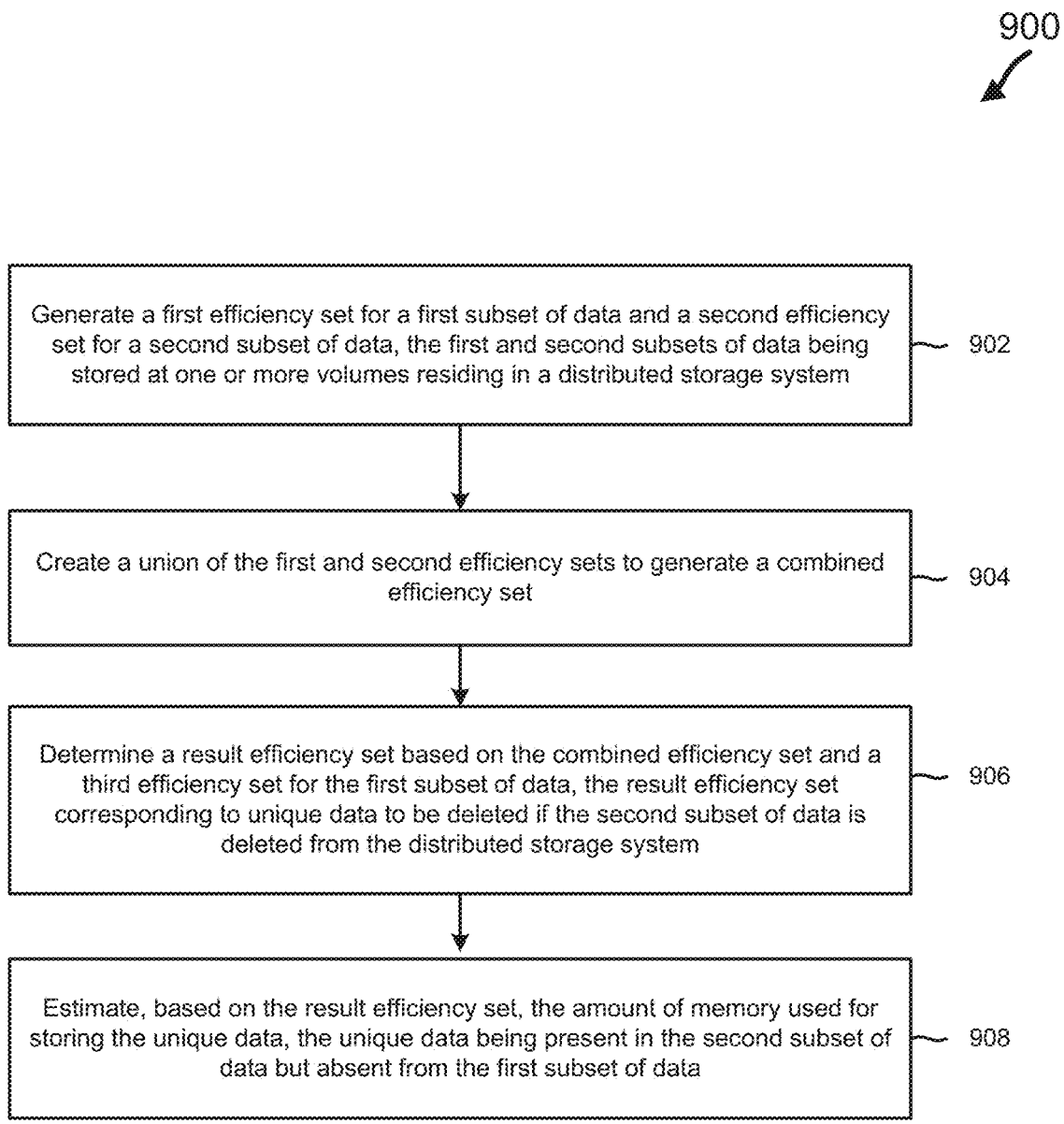
FIG. 9 illustrates a flow diagram of a method of determining a number of unique data blocks according to one or more aspects of the present disclosure.

FIG. 9 illustrates a flow diagram of a method 900 of estimating an amount of memory used for storing unique data according to one or more aspects of the present disclosure. Blocks of the method 900 can be executed by a computing device (e.g., a processor, processing circuit, and/or other suitable component, such as of a storage node 303). For example, the slice service 306 and/or the content manager 320 (e.g., one or more components, such as the snapshot module 322, the efficiency set generator 324, and/or the unique data module 326) may execute one or more blocks of the method 900. As illustrated, the method 900 includes a number of enumerated blocks, but embodiments of the method 900 may include additional blocks before, after, and in between the enumerated blocks. In some embodiments, one or more of the enumerated blocks may be omitted or performed in a different order.

At block 902, the method 900 includes generating a first efficiency set for a first subset of data and a second efficiency set for a second subset of data, the first and second subsets of data being stored at one or more volumes residing in a distributed storage system. In an example, the efficiency set generator 324 may generate the first and second efficiency sets in relation to aspects of FIG. 4. The first subset of data may correspond to data that will remain on the system, and the second subset of data may correspond to data that the client may want to delete from the distributed storage system. In some aspects, the first and second subsets of data are stored at a single volume. In some aspects, the first and second subsets of data are stored across a plurality of volumes.

At block 904, the method 900 includes creating a union of the first and second efficiency sets to generate a combined efficiency set. In an example, the efficiency set generator 324 may create the union of the first and second efficiency sets to generate the combined efficiency set.

At block 906, the method 900 includes determining a result efficiency set based on the combined efficiency set and a third efficiency set for the first subset of data, the result efficiency set corresponding to unique data to be deleted if the second subset of data is deleted from the distributed storage system. In an example, the unique data module 326 may generate the third efficiency set and determine the result efficiency set based on the combined and third efficiency sets. For example, the unique data module 326 may determine the result efficiency set by subtracting the third efficiency set from the combined efficiency set.

At block 908, the method 900 includes estimating, based on the result efficiency set, an amount of memory used for storing the unique data, the unique data being present in the second subset of data but absent from the first subset of data. For example, the unique data is referenced by the second subset of data but not by the first subset of data. In an example, the unique data module 326 may estimate, based on the result efficiency set, the amount of memory used for storing the unique data. The result efficiency set may include a group of unmasked block identifiers corresponding to the unique data.

Figure 10A:
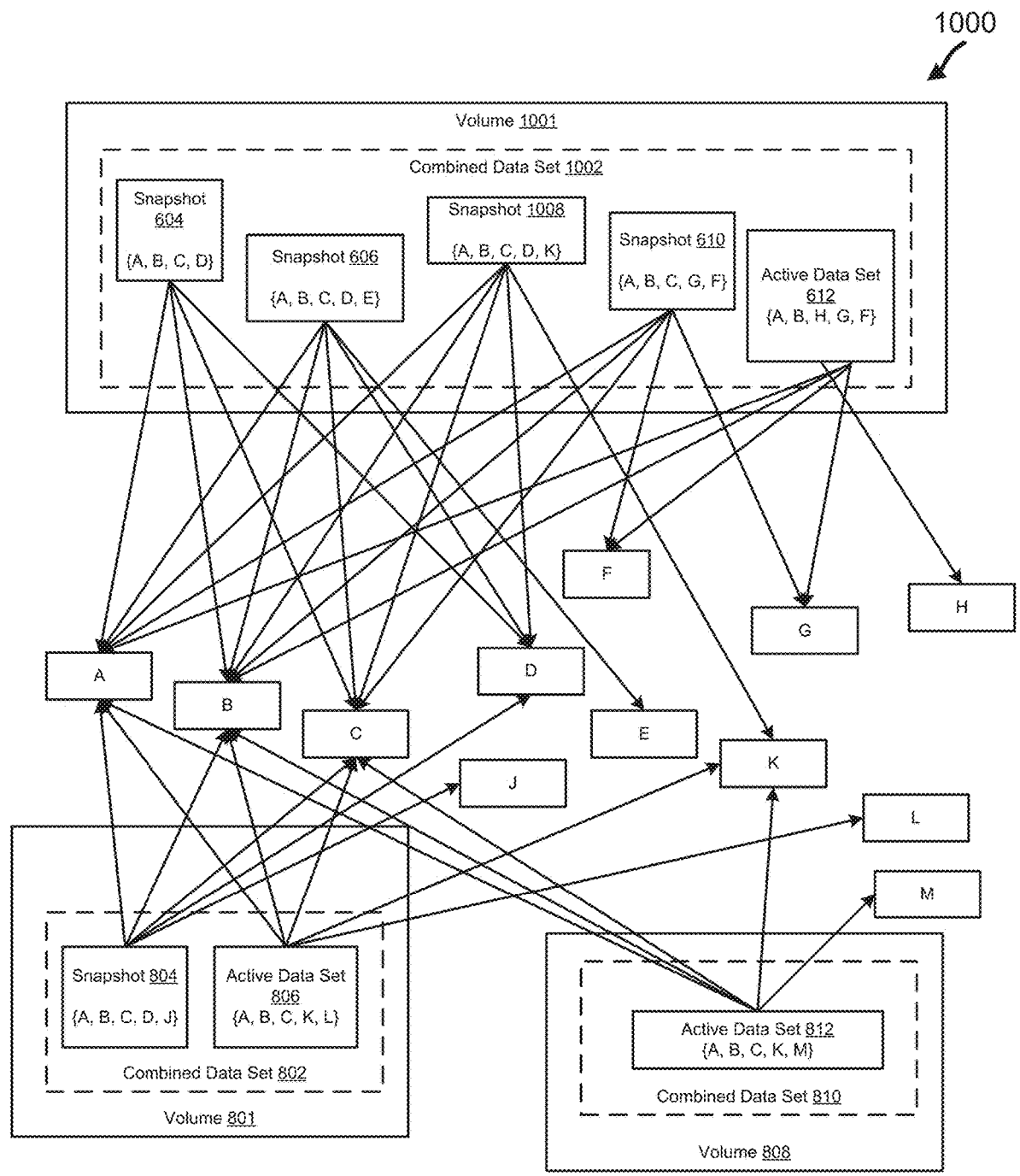
FIGS. 10A and 10B illustrate a block diagram of a set of snapshots and an active data set across a plurality of volumes in accordance with one or more aspects of the present disclosure.
Figure 10B:
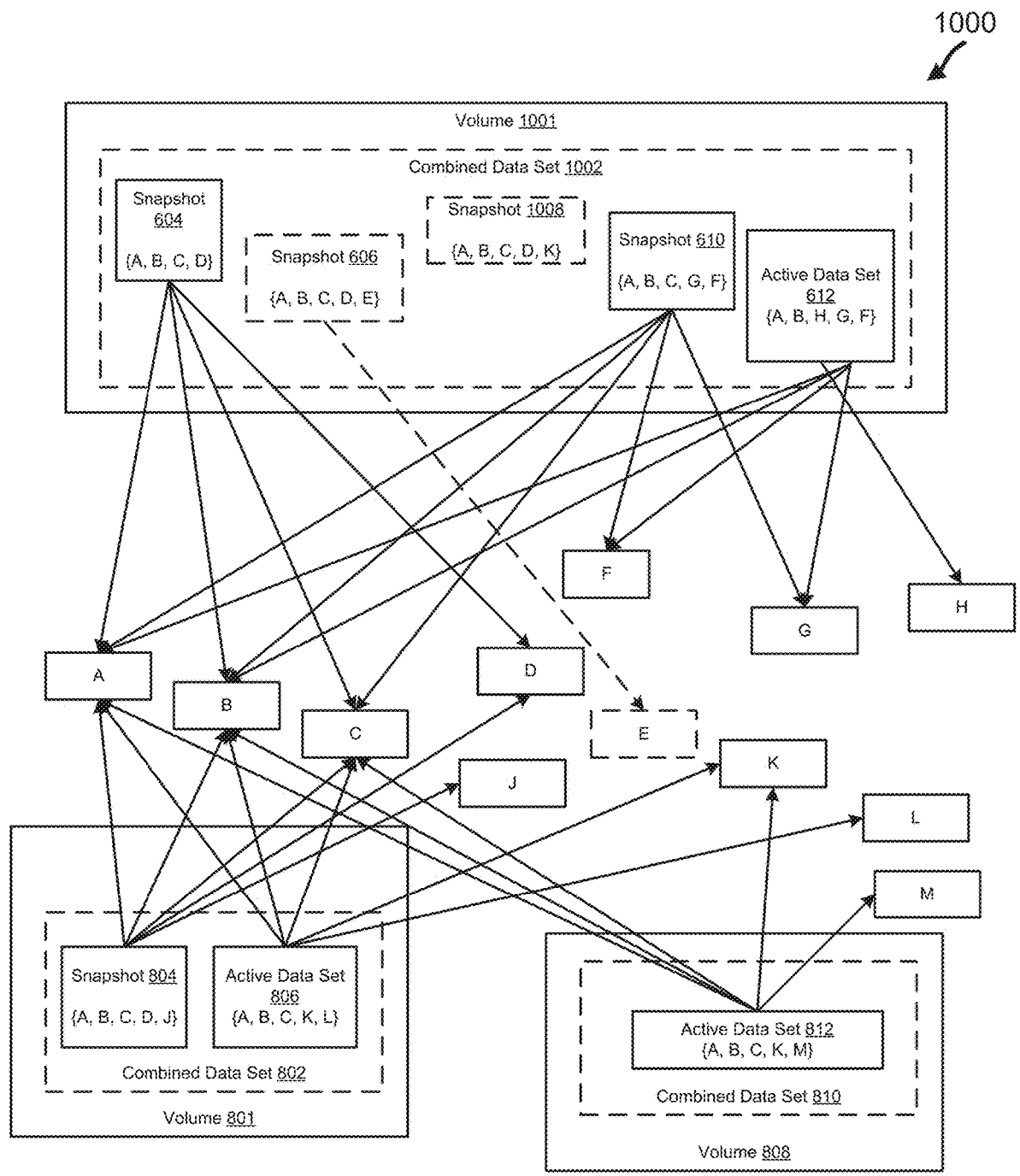

FIGS. 10A and 10B illustrate a block diagram 1000 of a set of snapshots and an active data set across a plurality of volumes in accordance with one or more aspects of the present disclosure. In FIG. 10A, a volume 1001 stores a combined data set 1002 including a set of snapshots and the active data set 612. The set of snapshots includes a snapshot 604, a snapshot 606, and a snapshot 610, as discussed above in relation to aspects of FIGS. 6A and 6B. The set of snapshots also includes a snapshot 1008, which references data blocks {A, B, C, D, K}. FIG. 10A also includes the volume 801 and the volume 808, as discussed above in relation to aspects of FIGS. 8A and 8B. By way of example, it may be of interest to delete only snapshots 606 and 1008 from the distributed storage system. Thus, the content manager 320 may determine an amount of memory used for storing unique data of snapshots 606 and 1008 stored at volume 1001, the amount of unique data corresponding to an amount of memory that is recovered by removing the snapshots 606 and 1008 from the distributed storage system.

In some aspects, the efficiency set generator 324 may generate a first combined efficiency set for a first subset of data, the first subset of data being stored at the volume 1001 of a plurality of volumes. The first subset of data may correspond to the snapshots 606 and 1008 that are being considered for removal from the distributed storage system, and the second subset of data may correspond to the remaining data stored at the volume 1001. For example, the efficiency set generator 324 may generate the first combined efficiency set for the first subset of data by generating a first efficiency set for the snapshot 606 corresponding to data blocks {A, B, C, D, E} and generating a second efficiency set for the snapshot 1008 corresponding to data blocks {A, B, C, D, K}. The efficiency set generator 324 may generate the first combined efficiency set by creating a union of the first and second efficiency sets. The first combined efficiency set may correspond to the data blocks {A, B, C, D, E, K}, which are referenced by the snapshots 606 and 1008.

The unique data module 326 may determine a first set difference based on the first subset of data and a second subset of data stored at the volume 1001. The second subset of data may correspond to the remaining data stored at the volume 1001 and may accordingly include snapshot 604, snapshot 610, and active data set 612. For example, the unique data module 326 may subtract a third efficiency set for the snapshot 604 corresponding to data blocks {A, B, C, D}, a fourth efficiency set for the snapshot 610 corresponding to data blocks {A, B, C, D, E}, and a fifth efficiency set for the active data set 612 corresponding to data blocks {A, B, H, G, F} from the first combined efficiency set (e.g., {A, B, C, D, E, K}−{A, B, C, D}−{A, B, C, D, E}−{A, B, H, G, F}) to determine the first set difference. The first set difference may correspond to the data blocks {E, K}, which correspond to data blocks that are referenced by the snapshots 606 and 1008, but are not referenced by the snapshot 604, the snapshot 610, or the active data set 612.

The unique data module 326 may determine a second set difference based on the first set difference and the efficiency sets for one or more volumes of the plurality of volumes. For example, the unique data module 326 may subtract a sixth efficiency set for the volume 801 and a seventh efficiency set for the volume 808 from the first set difference to determine the second set difference (e.g., {E, K}−{A, B, C, D, J, K, L}−{A, B, C, K, M}). The second set difference may correspond to the data block {E}, which corresponds to a unique data block referenced by the snapshot 606 and/or snapshot 1008 compared to or relative to the plurality of volumes including volume 1001, volume 801, and volume 808. In other words, data block {E} is present in the snapshot 606 or 1008 but absent from the snapshot 604, the snapshot 606, and the active data set 612 stored at the volume 1001 and is further absent from the volumes 801 and 808.

FIG. 10B illustrates the snapshots 606 and 1008 stored at the volume 1001 that are removed from the distributed storage system, as shown by the dashed lines. The arrows referencing the data blocks from the removed snapshots 606 and 1008 are also removed, except for a dashed line referencing the unique data block {E}. The unique data module 326 may determine that the data block {E} is a unique data block of the snapshots 606 and 1008 relative to the data stored at volume 1001, 801, and 808. In other words, if the client 314 were to delete the snapshots 606 and 1008, the client 314 may recover the amount of memory used for storing the data block {E}. The content manager 320 may remove the unique data (e.g., data block {E}) from the distributed storage system in response to a request (e.g., client request) to remove the snapshots 606 and 1008, where a difference between the snapshots 606 and 1008 and the unique data remain used in the distributed storage system after completing the request to remove the snapshots 606 and 1008. In this example, the other data blocks referenced by the snapshots 606 and 1008 (e.g., data blocks {A, B, C, D, K}) would remain used in the system because they are shared with another snapshot that remains stored in the distributed storage system, shared with the active data set 612, shared with the volume 801, and/or shared with the volume 808. The unique data module 326 may estimate the amount of memory space that is used for storing unique data of one or more snapshots (e.g., snapshots 606 and 1008) across the plurality of volumes in accordance with, for example, Equation (2) above.

In some aspects, the efficiency set generator 324 may trim one or more efficiency sets to reduce the memory footprint for storing the one or more efficiency sets. The efficiency set generator 324 may trim one or more efficiency sets by applying a filter to the efficiency sets. For example, criteria for inclusion in an efficiency set may be made stricter as a data set grows in size by applying a filter. Regarding aspects of the FIGS. 5, 6A, 6B, 7, 8A, 8B, 8C, 9, 10A, and 10B, the efficiency set generator 324 may apply the same filter level to all data sets or before computing the set difference. The content manager 320 may choose the filter levels to be the same such that if a particular data block "B" is included in two different data sets (e.g., volumes or sets of volumes or snapshots, etc.) being considered together to form two different efficiency sets, one for each of the data sets, then either the block identifier for "B" is in both of the efficiency sets (because the block identifier passes the filter at that level) or it is in neither (because it does not pass the filter).

A filter provides a test of membership in an efficiency set. For example, to be considered an initial member in an efficiency set, the efficiency set generator 324 may apply a filter to a candidate block identifier to determine whether the candidate block identifier matches a threshold of bits. The filter may specify that a threshold number of bits (e.g., zero bits or some positive number of bits) of the candidate block ID should match a particular filter sequence of bits in block identifiers that are members of the efficiency set. In an example, the threshold of bits may be zero, and each candidate block identifier accordingly passes the membership test. If the candidate block identifier passes the membership test, the efficiency set generator 324 may include the candidate block identifier in the efficiency set. If the candidate block identifier does not pass the membership test, the efficiency set generator 324 does not include the candidate block identifier in the efficiency set. As the efficiency set membership grows, the number of entries (e.g., block identifiers) in the efficiency set may exceed a threshold of entries (e.g., 2,000 entries).

If the efficiency set generator 324 determines that the efficiency set exceeds the threshold of entries, the efficiency set generator 324 may increase a strictness of the filter by updating the threshold of bits. The efficiency set generator 324 may update the threshold of bits by increasing the threshold of bits. For example, the stricter filter may specify that the candidate block identifier should match the updated threshold of bits in block identifiers that are members of the efficiency set. The efficiency set generator 324 may apply the stricter filter to a block identifier to determine whether the block identifier matches the updated threshold of bits, where the block identifier may be a block identifier that is a member of the efficiency set and/or a candidate block identifier. In an example, the updated threshold of bits is greater than the initial threshold of bits, and the efficiency set accordingly fills up slower compared to when the initial filter was applied. For example, the updated threshold of bits may be one bit, so that each candidate block identifier may be included in the efficiency set (or may be said to pass the test for membership) when one given bit in the filter matches the corresponding bit in the block identifier. If the candidate block identifier passes the membership test, the efficiency set generator 324 may include the candidate block identifier in the efficiency set. If the candidate block identifier does not pass the membership test, the efficiency set generator 324 does not include the candidate block identifier in the efficiency set. Again, as the membership grows, the number of entries (e.g., block identifiers) in the efficiency set may again exceed the threshold of entries (e.g., 2,000 entries).

Similar to the above discussion, if the efficiency set generator 324 determines that the efficiency set exceeds the updated threshold of entries, the efficiency set generator 324 may increase a strictness of the filter by updating the updated threshold of bits (e.g., increasing the updated threshold of bits). The efficiency set generator 324 may continue to perform this process until all applicable block identifiers have been tested for membership. The efficiency set generator 324 may perform this process on individuals efficiency sets and/or a union of efficiency sets.

As discussed, the efficiency set generator 324 may create a union of efficiency sets and allow the efficiency sets to grow arbitrarily large. For example, when combining efficiency sets for a first volume and a second volume, the desired maximum efficiency set size may be exceeded, triggering a stricter filter to be applied to one or more data sets. As discussed above, the efficiency set generator 324 may perform a comparison using a stricter filter to reduce entries included in a union of the efficiency sets. In some aspects, the efficiency set generator 324 may determine a maximum filter level within the efficiency sets as they were initially created. The efficiency set generator 324 may apply the maximum filter level at different steps or blocks in the methods 500, 700, and/or 900 for determining unique data discussed in relation to, for example, aspects of FIGS. 5, 7, and/or 9, respectively. For example, the efficiency set generator 324 may apply the maximum filter level after computing the set difference. In another example, the efficiency set generator 324 may apply the maximum filter level to all efficiency sets involved in the calculation to compute the set difference. In this example, the efficiency set generator 324 applies the maximum filter level before computing the set difference.

In some aspects, the efficiency set generator 324 may generate a first efficiency set by applying a first filter to an efficiency set for a first volume. The first efficiency set may, for illustrative purposes only, correspond to data blocks {A, B, C, D, E, F, G} of the first volume and may include a first group of masked block identifiers. The efficiency set generator 324 may generate a second efficiency set by applying a second filter to an efficiency set for a second volume. The second efficiency set may, for illustrative purposes only, correspond to data blocks {G, H, J, K, L, M} of the second volume and may include a second group of masked block identifiers. The first filter may specify that a candidate block identifier should match a first threshold of three bits (e.g., filter level=3) in block identifiers that are members of the first efficiency set, and the second filter may specify that a candidate block identifier should match a second threshold of two bits (e.g., filter level=2) in block identifiers that are members of the second efficiency set.

The efficiency set generator 324 may generate a third efficiency set by applying the first filter to the efficiency set for the second volume. The third efficiency set may, for illustrative purposes only, correspond to data blocks {G, J, K} of the second volume and may include a third group of masked block identifiers, which may be a subset of the second group of masked block identifiers. By applying the stricter first filter to the efficiency set for the second volume instead of the second filter, the efficiency set generator 324 may discard about half of the data blocks (e.g., {H, L, M}) corresponding to the second efficiency set.

In some aspects, the efficiency set generator 324 may create a union of the first and third efficiency sets, the union efficiency set corresponding to data blocks {A, B, C, D, E, F, G, J, K} and including a fourth group of masked block identifiers. The fourth group of masked block identifiers may be a subset of the union of the first and third group of masked block identifiers. In some examples, the efficiency set generator 324 may apply a third filter that is stricter compared to the first and second filter, the third filter specifying that a candidate block identifier should match a third threshold of four bits (e.g., filter level=4) in block identifiers that are members of the union efficiency set. For example, the resulting efficiency set based on the applying the first filter to the union of the first and third efficiency sets may correspond to data blocks {A, B, D, F, G} and include a fifth group of masked block identifiers. The fifth group of masked block identifiers may be a subset of the fourth group of masked block identifiers.

In some aspects, rather than create the union of the first and third efficiency sets, the efficiency set generator 324 may generate an efficiency set for the data objects (e.g., set of snapshots, set of volumes, etc.) that the client is considering deleting from the distributed storage system and subtract an efficiency set for the universe of data set, each time applying the strictest filter to the efficiency set. To compare efficiency sets, the content manager 320 may apply the same membership test to all sets that are being compared. If two or more efficiency sets that the content manager 320 wishes to consider have different membership criteria (i.e., the strictness of the membership was different), the content manager 320 may compare the efficiency sets if the content manager 320 applies the strictest of the criteria across all the efficiency sets when performing the comparison. This level of strictness may be smaller than the level of strictness that may be automatically imposed to limit the size of an efficiency set if the content manager 320 were to combine all the efficiency sets into a larger efficiency set by taking the union.

For example, in keeping with the example above in which the efficiency set generator 324 generates the first efficiency set for the first volume corresponding to data blocks {A, B, C, D, E, F, G} and generates the second efficiency set for the second volume corresponding to data blocks {G, H, J, K, L, M}, the unique data module 326 may determine a set difference by subtracting the first efficiency set from the second efficiency set (e.g., Second efficiency set−First efficiency set={G, H, J, K, L, M}−{A, B, C, D, E, F, G}). The set difference may correspond to data blocks {H, J, K, L, M}, before applying the third filter (e.g., filter level=3). The efficiency set generator 324 may apply the third filter to the set difference corresponding to data blocks {H, J, K, L, M} and accordingly may discard data blocks {H, L, M}, resulting in data blocks {J, K}. Accordingly, if the second volume is deleted from the distributed storage system and assuming the second volume has data blocks in common only with the first volume, the unique data module 326 may estimate that there are two data blocks worth of data at filter level three. The unique data module 326 may apply Equation (2) above to determine, for example, the number of data blocks that would be reclaimed by deleting the second volume from the distributed storage system. For example, the unique data module 326 may determine that the three data blocks would be reclaimed in the above example.

It may be desirable to not overly increase the strictness of the filter because as the strictness of the filter increases, the fractional uncertainty of the estimated amount of unique data that is determined remains the same. Because more data is being combined into an efficiency set, that fractional uncertainty represents a greater absolute uncertainty. Accordingly, the efficiency set generator 324 may create a union of the applicable efficiency sets without applying a filter that is any stricter than the most-strict filter of the sets within that efficiency set.

The accuracy of estimating an amount of unique data is tunable via statistical estimates. For example, the higher the threshold of bits (e.g., the size of an efficiency set), the lower the statistical uncertainty in the data usage estimates for a volume. In an example, the efficiency set generator 324 may target an efficiency set size between 1,000 and 2,000 entries, which may yield an accuracy of approximately two to three percent statistical uncertainty in the data usage estimates for a volume. The uncertainty would be that two to three percent of the full data usage uncertainty for that volume. Accordingly, as an example, if the efficiency set indicates that one hundred Gigabytes are being used by the volume, then the uncertainty may be about two to three Gigabytes. By increasing the size of the efficiency set the statistical uncertainty in the data usage estimates for the volume may be decreased to, for example, one percent.

The present embodiments can take the form of an entirely hardware embodiment, an entirely software embodiment, or an embodiment containing both hardware and software elements. Accordingly, it is understood that any operation of the computing systems of computing architecture 100 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

Thus, the present disclosure provides a system, method, and machine-readable storage medium for determining an amount of memory used for storing unique data in a distributed storage system. In some embodiments, the method includes generating a combined efficiency set for a first data set stored at a first volume, the first data set including a first subset of data and a second subset of data in a distributed storage system. The method may also include generating one or more efficiency sets for the first subset of data and computing a set difference based on the combined efficiency set and the one or more efficiency sets. The method may further include estimating, based on the set difference, an amount of memory used for storing unique data of the second subset of data, where the first subset of data does not reference the unique data, and the second subset of data references the unique data.

In yet further embodiments, the non-transitory machine-readable medium has instructions for estimating an amount of memory used for storing unique data in a distributed storage system, including machine executable code which when executed by at least one machine, causes the machine to generate a first combined efficiency set for a plurality of volumes, generate a second combined efficiency set for one or more first data sets stored at one or more volumes of the plurality of volumes, compare the first and second combined efficiency sets, and estimate, based on the comparison, an amount of memory used for storing unique data of one or more second data sets stored at the one or more volumes of the plurality of volumes. The unique data may be referenced by the one or more second data sets but not referenced by the one or more first data sets.

In yet further embodiments, a computing device includes a memory containing a machine-readable medium comprising machine executable code having stored thereon instructions for estimating an amount of memory used for storing unique data in a distributed storage system; and a processor coupled to the memory. The processor may be configured to execute the machine executable code to generate a first efficiency set for a first subset of data and a second efficiency set for a second subset of data, where the first and second subsets of data are stored at one or more volumes residing in a distributed storage system, to create a union of the first and second efficiency sets to generate a combined efficiency set, to determine a result efficiency set based on the combined efficiency set and a third efficiency set for the first subset of data, where the result efficiency set corresponds to the unique data to be deleted if the second subset of data is deleted from the distributed storage system, and to estimate, based on the result efficiency set, the amount of memory used for storing the unique data, the unique data being present in the second subset of data but absent from the first subset of data.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   generating a combined efficiency set for a first data set stored at a first volume, the first data set including a first subset of data and a second subset of data in a distributed storage system;
   generating one or more efficiency sets for the first subset of data;
   computing a set difference based on the combined efficiency set and the one or more efficiency sets; and
   estimating, based on the set difference, an amount of memory used for storing unique data of the second subset of data, where the first subset of data does not reference the unique data, and the second subset of data references the unique data.

2. The method of claim 1, further comprising:
   removing the unique data from the distributed storage system in response to a request to remove the second subset of data, a difference between the second subset of data and the unique data remaining used in the distributed storage system after completing the request to remove the second subset of data.

3. The method of claim 1, wherein the first subset of data includes an active data set stored at the first volume, and the second subset of data includes a set of one or more snapshots stored at the first volume.

4. The method of claim 1, wherein the first subset of data includes an active data set and a first set of snapshots stored at the first volume, the second subset of data includes a second set of snapshots stored at the first volume, and the first set of snapshots is different from the second set of snapshots.

5. The method of claim 1, wherein generating the combined efficiency set includes applying a first mask to a set of block identifiers to mask at least one bit of each block identifier of the set of block identifiers, each block identifier of the set of block identifiers being used to access a particular data block corresponding to the first volume.

6. The method of claim 1, wherein computing the set difference includes subtracting the one or more efficiency sets from the combined efficiency set.

7. The method of claim 1, wherein estimating the amount of memory used for storing the unique data includes determining a product of a first number, a second number, and a third number, the first number being a number of data blocks included in the unique data based on the set difference, the second number being a power of two to a fourth number, the third number being an average block size of the number of data blocks, and the fourth number being a quantity of bits in a bitmask that is applied to block identifiers referencing the unique data.

8. The method of claim 1, wherein the one or more efficiency sets is a subset of the combined efficiency set.

9. The method of claim 1, wherein the first subset of data includes a plurality of data portions, and wherein generating the one or more efficiency sets for the first subset of data includes generating an efficiency set for each portion of the plurality of data portions.

10. A non-transitory machine-readable medium having stored thereon instructions for estimating an amount of memory used for storing unique data in a distributed storage system, comprising machine executable code which when executed by at least one machine, causes the machine to:
   generate a first combined efficiency set for a plurality of volumes;
   generate a second combined efficiency set for one or more first data sets stored at one or more volumes of the plurality of volumes;
   compare the first and second combined efficiency sets; and
   estimate, based on the comparison, an amount of memory used for storing unique data of one or more second data sets stored at the one or more volumes of the plurality of volumes, the unique data being referenced by the one or more second data sets but not referenced by the one or more first data sets.

11. The non-transitory machine-readable medium of claim 10, further comprising code, which causes the machine to:
   remove the unique data from the distributed storage system in response to a request to remove the one or more second data sets, a difference between the one or more second data sets and the unique data remaining used in the distributed storage system after completing the request to remove the one or more second data sets.

12. The non-transitory machine-readable medium of claim 10, wherein the plurality of volumes is associated with a same client account and included in a common cluster.

13. The non-transitory machine-readable medium of claim 10, further comprising code which causes the machine to:
   compare the first and second combined efficiency sets by subtracting the second combined efficiency set from the first combined efficiency set.

14. The non-transitory machine-readable medium of claim 10, further comprising code, which causes the machine to:
   generate the first combined efficiency set by creating a union of an efficiency set for each volume of the plurality of volumes.

15. The non-transitory machine-readable medium of claim 10, wherein the second combined efficiency set is based on an active data set stored at each volume of the plurality of volumes.

16. The non-transitory machine-readable medium of claim 10, wherein the one or more first data sets is based on data stored at a first set of volumes of the plurality of volumes, and the one or more second data sets is based on data stored at a second set of volumes of the plurality of volumes.

17. A computing device comprising:
   a memory containing a machine-readable medium comprising machine executable code having stored thereon instructions for estimating an amount of memory used for storing unique data in a distributed storage system; and
   a processor coupled to the memory, the processor configured to execute the machine executable code to:
      generate a first efficiency set for a first subset of data and a second efficiency set for a second subset of data, the first and second subsets of data being stored at one or more volumes residing in a distributed storage system;
      create a union of the first and second efficiency sets to generate a combined efficiency set;
      determine a result efficiency set based on the combined efficiency set and a third efficiency set for the first subset of data, the result efficiency set corresponding to the unique data to be deleted if the second subset of data is deleted from the distributed storage system; and estimate, based on the result efficiency set, the amount of memory used for storing the unique data, the unique data being present in the second subset of data but absent from the first subset of data.

18. The computing device of claim 17, wherein the processor is configured to execute the machine executable code to:

remove the unique data from the distributed storage system in response to a request to remove the second subset of data, a difference between the second subset of data and the unique data remaining used in the distributed storage system after completing the request to remove the second subset of data.

19. The computing device of claim 17, wherein the processor is configured to execute the machine executable code to:

generate the third efficiency set for the first subset of data.

20. The computing device of claim 17, wherein the processor is configured to execute the machine executable code to:

estimate the amount of memory by determining a product of a first number, a second number, and a third number, the first number being a number of unique data blocks of the second subset of data based on the result efficiency set, the second number being a result of 2 to the power of a fourth number, the third number being an average block size of the unique data blocks, and the fourth number being a quantity of bits in a bitmask that is applied to block identifiers referencing the unique data blocks.

* * * * *